(12) United States Patent
Aratame et al.

(10) Patent No.: US 6,233,403 B1
(45) Date of Patent: May 15, 2001

(54) LENS-FITTED FILM UNIT WITH A BUILT-IN ELECTRONIC FLASH UNIT AND IMAGE FORMING METHOD BASED ON A PHOTOGRAPHIC FILM EXPOSED BY THE LENS-FITTED FILM UNIT WITH A BUILT-IN ELECTRONIC FLASH UNIT

(75) Inventors: Kazuhisa Aratame; Kijiro Suzuki; Kei Kaneiwa, all of Kobe; Masami Fujita, Hino; Hideaki Haraga, Hino; Ken Ishida, Hino; Jun Kitahara, Hino; Hiroshi Kibayashi, Hino; Yoshichika Noda, Hino; Kiyoaki Hazama, Hino; Yuichi Atarashi, Hino; Kiyoshi Yamashita, Hino; Toshifumi Iijima, Hino; Shuri Mizoguchi, Hino; Takao Hosaka, Hino, all of (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/430,962

(22) Filed: Nov. 1, 1999

(30) Foreign Application Priority Data

| Nov. 4, 1998 | (JP) | 10-313024 |
|---|---|---|
| Nov. 4, 1998 | (JP) | 10-313025 |
| Nov. 4, 1998 | (JP) | 10-313026 |
| Jan. 6, 1999 | (JP) | 11-001157 |
| Feb. 3, 1999 | (JP) | 11-026109 |
| Feb. 5, 1999 | (JP) | 11-028583 |
| Feb. 5, 1999 | (JP) | 11-028584 |
| Feb. 5, 1999 | (JP) | 11-028591 |
| Feb. 9, 1999 | (JP) | 11-031368 |
| Feb. 9, 1999 | (JP) | 11-031369 |

(51) Int. Cl.[7] .................................. G03B 15/03
(52) U.S. Cl. .............................. 396/6; 396/176
(58) Field of Search ........................ 396/6, 176

(56) References Cited

U.S. PATENT DOCUMENTS

| 3,707,118 | 12/1972 | Stoneham et al. | 396/501 |
|---|---|---|---|
| 5,634,163 | 5/1997 | Kamata | 396/458 |
| 5,721,963 | 2/1998 | Iwagaki et al. | 396/6 |
| 6,021,277 | * 2/2000 | Sowinski et al. | 396/6 |

OTHER PUBLICATIONS

European Search Report EP 99 30 8715.
Partial European Search Report EP 99 30 8715.

* cited by examiner

Primary Examiner—W. B. Perkey
(74) Attorney, Agent, or Firm—Jordan B. Bierman; Bierman, Muserlian & Lucas

(57) ABSTRACT

A lens-fitted film unit including a main body; a photographic film, pre-loaded in the main body; an electronic flash unit; a shutter unit; a camera lens; and a diaphragm. In the lens-fitted film unit, a guide number of the electronic flash unit, a T-number determined from the camera lens and the diaphragm and a shutter speed of the shutter unit are determined so that A is not more than 8.5 when A represents an EV value of a reference exposure amount of the lens-fitted film unit under a stroboscopic photographing state minus 1.5; and intensity of a latent image, formed on the photographic film under the condition that a reference reflection panel being placed at a predetermined distance between 2–3 m from the lens-fitted film unit is illuminated by the electronic flash unit without other lights in the stroboscopic photographing state, corresponds to intensity of a latent image obtained under a photographing condition of photographing luminance not more than A+5.0 in EV value.

30 Claims, 16 Drawing Sheets

—— SAGITTAL
---- MERIDIONAL

—— SAGITTAL
---- MERIDIONAL

LENS-FITTED FILM UNIT WITH A BUILT-IN ELECTRONIC FLASH UNIT AND IMAGE FORMING METHOD BASED ON A PHOTOGRAPHIC FILM EXPOSED BY THE LENS-FITTED FILM UNIT WITH A BUILT-IN ELECTRONIC FLASH UNIT

BACKGROUND OF THE INVENTION

The present invention relates to a lens-fitted film unit with a built-in electronic flash unit.

Since a lens-fitted film unit is featured to be simple and inexpensive, no function of exposure adjustment has been provided, a diaphragm has had only an open aperture of a camera lens, and only one shutter speed of about $1/125$ sec has been provided in the lens-fitted film unit. In addition, an f-number of the open aperture of the camera lens is about 10 (T-number based on the transmittance of the lens and the lens number is about 11), which means that the lens has a large f-number. Accordingly, if a film having the speed of ISO 100 is used, photographing is limited to that in the daytime on a fine day. Therefore, a film having the speed of ISO 400 is loaded so that photographing can be carried out in lower luminance.

For example, when it is assumed that the shutter speed is $1/125$ sec and an aperture is represented by T-number 11, an exposure for ISO 100 is EV 14. Therefore, if a film of ISO 400 is used, an EV value is 12, and it is possible to photograph in a luminance range from the daytime on a fine day to gloomy morning and evening.

However, it is still impossible to photograph indoors or at night. Therefore, there is available a lens-fitted film unit which houses therein an electronic flash unit to make it possible to photograph in low luminance. An electronic flash unit which emits brighter light, namely, the one which has larger capacity is desired so that the electronic flash unit makes it possible to photograph in the dark room. In the lens-fitted film unit, however, it is difficult to realize a large capacity electronic flash unit which makes it difficult to make a camera small and causes high cost. It is therefore common to use an electronic flash unit whose guide number for ISO 100 is about 10, as an electronic flash camera emitting the most bright light among those which do not cause the problems stated above.

However, even in this case, there have occurred frequently problems that a user felt an object distance in stroboscopic photographing to be insufficient. For example, when a film of ISO 400 is used and a T-number is made to be 11, an object distance for appropriate exposure is 1.8 m which is relatively short, and even if it is possible to compensate insufficient exposure up to EV 1.5 with latitude such as a film, the object distance up to about 3.0 m is a limit.

To extend an object distance in stroboscopic photographing, therefore, there is available on the market a lens-fitted film unit with a built-in electronic flash unit in which a film of ISO 800 is loaded. As a result, an object distance for appropriate exposure is 2.5 m under the same condition as in the foregoing, and the object distance is extended to 4.3 m if exposure insufficiency up to that of EV 1.5 is allowed.

However, it has been found that further problems are caused if the speed of the film is raised and electronic flash light is made to be of higher intensity (namely, capacitor capacity of an electronic flash unit is raised), for the purpose to make indoor or night photographing to be possible and to extend an object distance.

In stroboscopic photographing, an object distance for appropriate exposure is fixed to one point, and when a major object such as a person is set to that distance, an object which is closer than that major object is subjected to over-exposure, while, an object in the background which is farther than the major object is subjected to under-exposure. In particular, in the case of indoor photographing, electronic flash light does not arrive at an object and a possibility of under-exposure is high in broad rooms in European and American homes and in broad rooms such as hotel lobbies, or in the outdoors where illumination is poor, although under-exposure for an object in the background is reduced in a relatively narrow room like those in Japanese homes where illumination other than electronic flash light plays a part in exposure.

For example, in some of conventional lens-fitted film units which house a film of ISO 800, an f-number of an open aperture is 10.3, shutter speed is $1/110$, a guide number of an electronic flash unit is 11.6 for ISO 100. Accordingly, appropriate exposure for photographing by external light results at EV 10.5, while appropriate exposure for photographing by electronic flash light results at the distance of 3.2 m.

When this lens-fitted film unit is used for stroboscopic photographing in a broad room such as a hotel lobby or in the outdoors where illumination is poor, by placing a major object at the distance of 3.2 m, there results appropriate exposure on the major object. On the other hand, a remote background at which electronic flash light does not arrive is exposed by only external light, and if the remote background is sufficiently bright, the background can be recognized on the finished photograph. In a broad room such as a hotel lobby or in the outdoors where illumination is poor, however, brightness is not sufficient for the conventional lens-fitted film unit in many cases, and when a print is made under that condition so that appropriate exposure may result on a major object photographed with electronic flash light, the background turns out to be dark on the photograph. Namely, there has been a problem that a remote background recognized visually by human eyes can not be recognized at all on the finished photograph.

Further, for example, in an ordinary camera, a user can select an EV value within a relatively wide range, and the user sets a shutter speed and an aperture value in accordance with the situation, to conduct stroboscopic photographing with an EV value established by the user in broad rooms or in the outdoors where illumination is poor. However, this is very hard to understand for those who have no good knowledge about a camera, and they can sometimes photograph properly, while they can not photograph properly on the other occasion, to be inconsistent. On the other hand, a constant EV value has been employed in a lens-fitted film unit as stated above, because the primary object of the lens-fitted film unit is that it can be used simply for photographing even by a user having no good knowledge about a camera. The value, however, has not been preferable as stated above in stroboscopic photographing in broad rooms or in the outdoors where illumination is poor. Namely, a fixed EV value has been established for attaining that it is possible to photograph simply, but for that reason, there has been a problem that photographing under low brightness is difficult.

SUMMARY OF THE INVENTION

In view of the problems stated above, the invention has been achieved from the viewpoint which is quite different from the past to solve the two problems mentioned above.

Namely, an object of the invention is to provide a lens-fitted film unit wherein operation simplicity which is an advantageous point of a lens-fitted film unit is maintained, a background does not turn out to be dark in stroboscopic photographing in the broad rooms or in the outdoors where illumination is poor, and both of a relatively dark background and a major object which is at no great distance can be photographed stroboscopically to be well balanced.

The object mentioned above can be attained by the following structures and methods of the invention.

(Structure 1)

A lens-fitted film unit, including: a main body; a photographic film, pre-loaded in the main body; an electronic flash unit; a shutter unit; a camera lens; and a diaphragm; in which a guide number of the electronic flash unit, a T-number determined from the camera lens and the diaphragm and a shutter speed of the shutter unit are determined so that A is not more than 8.5 when A represents an EV value of a reference exposure amount of the lens-fitted film unit under a first photographing state minus 1.5; and intensity of a latent image, formed on the photographic film under the condition that a reference reflection panel being placed at a predetermined distance between 2–3 m from the lens-fitted film unit is illuminated by the electronic flash unit without other lights in the first photographing state, corresponds to intensity of a latent image obtained under a photographing condition of photographing luminance not more than A+5.0 in EV value.

(Structure 2)

The lens-fitted film unit of the above structure 1, in which the guide number of the electronic flash unit, the T-number determined from the camera lens and the diaphragm and the shutter speed of the shutter unit are determined so that a intensity of a latent image, formed on the photographic film under the condition that a reference reflection panel being placed at a predetermined distance between 2–3 m from the lens-fitted film unit is illuminated by the electronic flash unit without other lights in the first photographing state, corresponds to intensity of a latent image obtained under a photographing condition of photographing luminance not more than A+4.5 in EV value.

(Structure 3)

The lens-fitted film unit of the above structure 1, in which a shutter speed in the first photographing state is slower than a shutter speed in a second photographing state that photographing is executed without using the electronic flash unit.

(Structure 4)

The lens-fitted film unit of the above structure 1, in which a T-number in the first photographing state is smaller than a T-number in a second photographing state that photographing is executed without using the electronic flash unit.

(Method 1)

An image forming method, including the steps of: photographing a picture with a lens-fitted film unit; exposing a photographic film, pre-loaded in the lens-fitted film unit; taking out the photographic film, pre-loaded in the lens-fitted film unit having an electronic flash unit and exposed by a photographing operation, from the lens-fitted film unit; developing the photographic film; and forming a visible image on an image carrier according to image information formed on the photographic film by the developing step; in which the lens-fitted film unit comprises a main body, the photographic film, pre-loaded in the main body, the electronic flash unit, a shutter unit, a camera lens, and a diaphragm; a guide number of the electronic flash unit, a T-number determined from the camera lens and the diaphragm and a shutter speed of the shutter unit are selected so that a minimum photographing luminance, which enables latent image forming on the photographic film by which an image is able to be formed on the image carrier when a photographing operation is carried out with a T-number and a shutter speed of a first photographing state without execution of the electronic flash unit, is not more than 8.5; and a difference between a background luminance and a luminance of a reference reflection panel is within a latitude of the image carrier that the image is able to be formed thereon when the reference reflection panel being placed at a predetermined distance between 2–3 m from the lens-fitted film unit is illuminated by the electronic flash unit under the minimum photographing luminance as the background luminance in the first photographing state.

(Method 2)

A lens-fitted film unit, including: a main body; a photographic film, pre-loaded in the main body; an electronic flash unit; a shutter unit; a camera lens; and a diaphragm; in which a guide number of the electronic flash unit, a T-number determined from the camera lens and the diaphragm and a shutter speed of the shutter unit are determined so that a minimum photographing luminance, which enables latent image forming on the photographic film by which an image is able to be formed on an image carrier when a photographing operation is carried out in a first photographing state without execution of the electronic flash unit, is not more than 8.5; and a difference between a background luminance and a luminance of a reference reflection panel is within a latitude of the image carrier that the image is able to be formed thereon when the reference reflection panel being placed at a predetermined distance between 2–3 m from the lens-fitted film unit is illuminated by the electronic flash unit under the minimum photographing luminance as the background luminance in the first photographing state.

(Structure 5)

A lens-fitted film unit with a built-in electronic flash unit wherein a reference exposure amount is 10 or less in terms of EV value by an exposure means under the state of stroboscopic photographing, and there is provided an electronic flash unit emitting a quantity of light by which electronic flash light only causes appropriate exposure on an object when the object is placed at the prescribed distance within a range from 2 m to 3 m from the camera.

(Structure 6)

A lens-fitted film unit with a built-in electronic flash unit wherein a capacity of a main capacitor of an electronic flash unit is made to be in a range from 15 $\mu$F to 80 $\mu$F, and when A' represents an EV value determined by an aperture value of a camera lens, a shutter speed and a speed of a built-in film in the first photographing state, and B represents an EV value in the second photographing state, $6 \leq A' \leq 10$ and $A'+1 \leq B \leq A'+4$ are satisfied.

(Structure 7)

A lens-fitted film unit with a built-in electronic flash unit having therein a built-in film and an electronic flash unit wherein when SS represents a shutter speed in stroboscopic photographing and GNo represents a guide number of the electronic flash unit for ISO 100, the following conditional expression is satisfied.

$$GNo^2/SS < 8000$$

(Structure 8)

A lens-fitted film unit having therein a built-in film and an electronic flash unit wherein a camera lens and a diaphragm member are provided, the diaphragm member is structured so that an aperture value of the camera lens may be switched at least between the first aperture value and the second aperture value which is smaller than the first aperture value in terms of an aperture, and when M 24 represents MTF of the camera lens in the vicinity of an optical axis in spatial frequency 15.00 lines/mm at the second aperture value at an object distance of 4 m and M 22 represents MTF of the camera lens in the vicinity of an optical axis in spatial frequency 15.00 lines/mm at the second aperture value at an object distance of 2 m, the following conditional expressions are satisfied.

$$0.1 < M24$$

$$0.1 < M22$$

(Structure 9)

A lens-fitted film unit having therein a built-in film and an electronic flash unit wherein a guide number of the electronic flash unit, a shutter speed of a shutter unit and an aperture of a camera lens are established so that a luminance difference between a major object and a background may be within a range of a latitude of an image carrier on which a final visible image is formed based on information of the film, when the major object and the background in stroboscopic photographing are formed as latent images on the film in photographing in which luminance of the background in the state of stroboscopic photographing is not more than 9 in terms of EV value.

(Structure 10)

A lens-fitted film unit having therein a built-in film and an electronic flash unit wherein when A represents the lowest photographing luminance in terms of EV value which can form on the built-in film a latent image enabling formation of a print image, in photographing conducted, in the state of stroboscopic photographing, with a shutter speed of a shutter unit and an aperture value of a camera lens and without electronic flash light of the electronic flash unit, A is not more than 8.5, and a latent image formed on the film when a standard object standing at the object distance of 2–3 m is illuminated by the electronic flash unit corresponds to an latent image obtained under the condition of photographing luminance which is not more than A+4.5 in terms of EV value.

(Structure 11)

A lens-fitted film unit with a built-in electronic flash unit having therein a built-in film and an electronic flash unit wherein a guide number of the electronic flash unit is from 11 to 12, and a shutter speed is switched to the higher speed, interlocking with switching on a switch for the electronic flash unit from the state of using to the state of non-using.

(Structure 12)

A lens-fitted film unit having therein a built-in film and an electronic flash unit wherein the electronic flash unit emits electronic flash light so that a luminance difference between a major object and a background which are illuminated by electronic flash light may be not more than 4.5 in terms of EV value on the built-in film in stroboscopic photographing in which the background is not more than 9 in terms of EV value and the major object is within a depth of field of a camera lens.

(Structure 13)

A lens-fitted film unit having therein a built-in film and an electronic flash unit wherein there is provided a means which adjusts electronic flash light so that a luminance difference between a major object and a background with luminance which can form on the film a latent image enabling printing in stroboscopic photographing may be equivalent to 4.5 or less in terms of EV value on the built-in film, in photographing where a background is not more than 9 in terms of EV value.

BRIEF DESCRIPTION OF THE DRAWINGS

Each of FIG. 11A

Each of FIG. 12D

Each of FIG. 13A

Each of FIG. 14D

DETAILED DESCRIPTION OF THE INVENTION (First Embodiment)

The first embodiment of a lens-fitted film unit with a built-in electronic flash unit of the invention will be explained as follows, referring to FIGS. 1 and 2.

Figure 1:
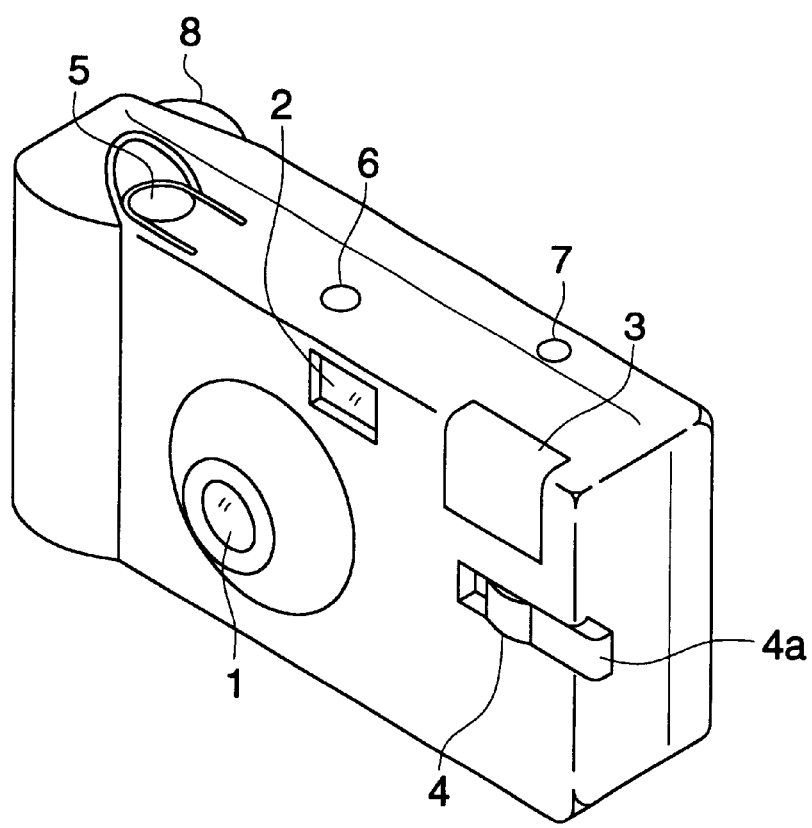
FIG. 1 is a perspective view of an exterior view of a lens-fitted film unit with a built-in electronic flash unit.

FIG. 1 is a perspective view of an exterior view of a lens-fitted film unit with a built-in electronic flash unit. On the front side, there are provided camera lens 1, view finder window 2, electronic flash light emitting panel 3 and electronic flash switching lever 4, on the top side, there are provided shutter-release button 5, frame counter window 6 and charge indication window 7, and on the rear side, there is provided film-winding knob 8.

In the case of conducting stroboscopic photographing, when the electronic flash switching lever 4 representing a switching means to switch between using and non-using of an electronic flash unit is slid toward the right side in the diagram, an inner main switch is turned on and charging of the electronic flash unit is started. When the inner main capacitor is charged to the prescribed voltage, it is possible to recognize the charged state by the charge indication window 7 which is lit. For photographing, the shutter-release button 5 is pressed. Incidentally, when the electronic flash switching lever 4 is slid toward the right side as shown in the diagram, tip portion 4a is protruded to the right to turn on the main switch for the electronic flash unit, which makes it possible to judge easily that the film unit is ready for stroboscopic photographing.

Figure 2:
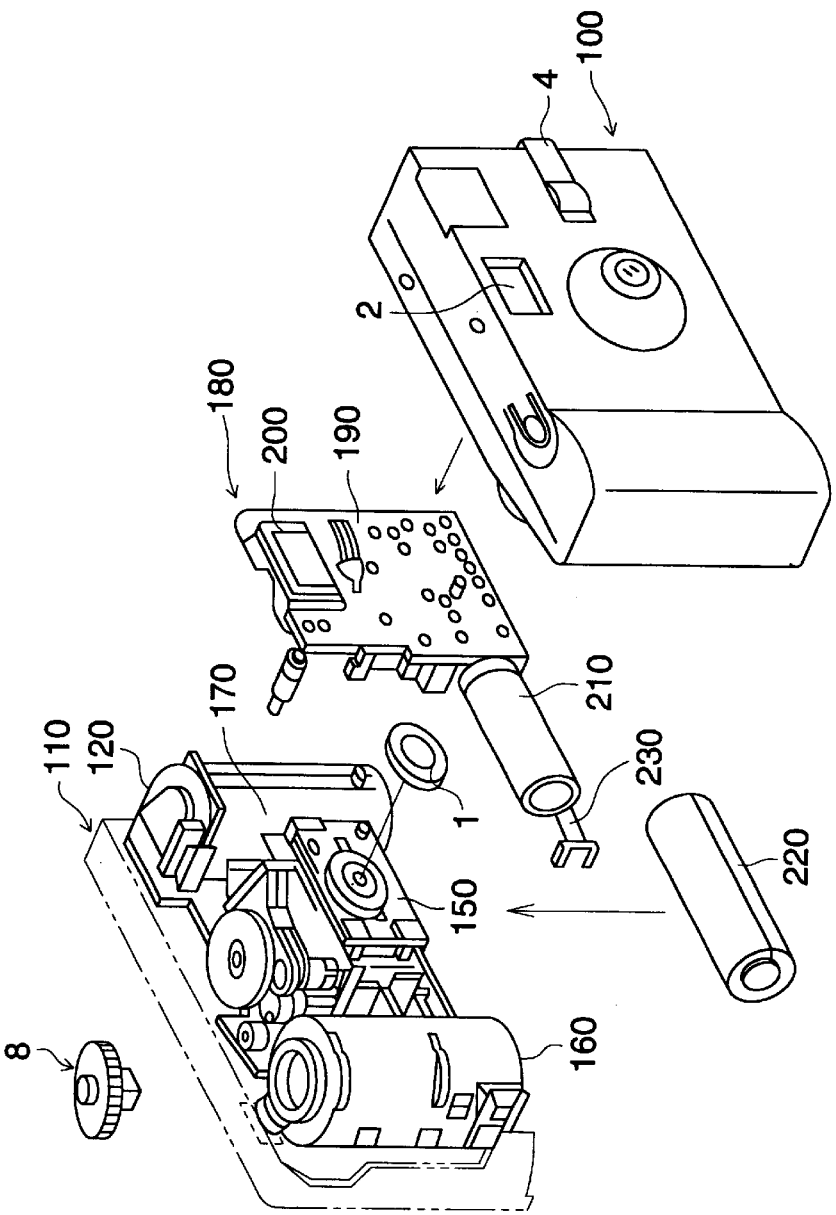
FIG. 2 is an exploded perspective view of a lens-fitted film unit with a built-in electronic flash unit.

Further, the exploded perspective view in FIG. 2 shows that the lens-fitted film unit of the present embodiment is composed of main body 120, front cover 100 and rear cover 110, in which the front cover 100 and the rear cover 110 are incorporated to the main body 120 from both sides.

On the central portion of the main body 120, there is provided photographing frame 150 which is sandwiched by cartridge chamber 160 and unexposed film chamber 170 both arranged respectively on one side and on the other side of the photographing frame 150. In the cartridge chamber 160, there is loaded a cartridge for a photographic film, and in the unexposed film chamber 170, there is housed a photographic film wound around a spool, and the photographic film is taken up by film-winding knob 8 after photographing to be wound around a cartridge spool in the cartridge. A shutter unit and a diaphragm are also provided on the main body 120. Further, it is still possible that there is not provided a spool in the unexposed film chamber 170.

The film-winding knob 8 is arranged on the upper part of the cartridge chamber 160, and camera lens 1 is provided on the front side of the photographing frame 150. On the upper portion of the photographing frame 150, there is arranged a view finder window 2 which is provided on the front cover 100.

Further, on the lens-fitted film unit, there is provided electronic flash unit 180. Electronic flash base plate 190 of the electronic flash unit 180 is mounted on the front side of the unexposed film chamber 170. On the electronic flash base plate 190, there is arranged a circuit element, and at the upper position, there is connected light emitting section 200 which agrees positionally with electronic flash light emitting panel 3 provided on the front cover 100.

On the lower part of the electronic flash base plate 190, there is connected main capacitor 210, and power supply battery 220 is connected with the electronic flash base plate 190 through lead plate 230. Light emitting section 200 is made to emit light by voltage charged in main capacitor 210 by power supply battery 220.

Below the electronic flash light emitting panel, there is provided electronic flash switching lever 4 serving as a electronic flash switch, and in case of stroboscopic photographing, this electronic flash switching lever 4 is operated to charge main capacitor 210 so that electronic flash light is emitted in synchronization with exposure to the photographic film.

Incidentally, in the present embodiment, there is shown a lens-fitted film unit which is composed of the main body, the front cover and the rear cover. The structure wherein the main body serves also as either one or both of the front cover and the rear cover is naturally acceptable. Or, the structure wherein a lens-fitted film unit is composed of the main body, the right cover and the left cover is acceptable.

A photographic film which is loaded in the main body in advance may be either a negative film or a reversal film, but a negative film is preferable for the invention. When a film is a 135 film, it is preferable that ISO speed is 400 or more, and 640 is more preferable. When a film is an APS film, it is preferable that ISO speed of the film is between 400 and 800, and it is more preferable that ISO speed is between 400 and 640.

Incidentally, the lens-fitted film unit related to the first embodiment is one whose main object is to photograph an object which is backed by a dark background, such as indoor photographing or photographing of a night view, and even when the electronic flash switch lever is protruded toward the right side to turn on the electronic flash switch, neither the shutter speed of the shutter unit nor T-number determined by a camera lens and a diaphragm is changed. In other words, the first embodiment is one wherein the state of normal photographing and the state of stroboscopic photographing are on the same condition (excluding whether the electronic flash unit emits light or not).

Incidentally, "first photographing state" preferably means "the state of stroboscopic photographing" and "second photographing state" preferably means "the state of normal photographing". The state of stroboscopic photographing mentioned herein means conditions (T-number, shutter speed, etc.) of a lens-fitted film unit in the course of stroboscopic photographing, while the state of normal photographing means conditions (T-number, shutter speed, etc.) of a lens-fitted film unit in the course of non-stroboscopic photographing. Usually, switching between the state of stroboscopic photographing and the state of normal photographing is conducted, interlocking with the electronic flash switch lever representing a switching means.

The lens-fitted film unit in the first embodiment is one wherein a guide number of an electronic flash unit, T-number determined by a camera lens and an diaphragm and shutter speed of a shutter unit are determined so that A is not more than 8.5 when A represents EV value of reference exposure amount A' of lens-fitted film unit—1.5 in the state of stroboscopic photographing (same as the state of normal photographing in the present embodiment), and a latent image formed on a photographic film when a reference reflection panel positioned at the prescribed distance of 2–3 m from the lens-fitted film unit is illuminated by an electronic flash unit and photographed in the state of stroboscopic photographing under the condition of no external light may correspond to a latent image obtained under the condition of photographing luminance of not more than A+5.0 in terms of EV value.

Incidentally, it is preferable that A is not more than 7.5. Further, it is more preferable that a guide number of an electronic flash unit, a T-number determined by a camera lens and an diaphragm, and a shutter speed of a shutter unit are determined so that a latent image formed on a photographic film when a reference reflection panel positioned at the prescribed distance of 2–3 m from the lens-fitted film unit is illuminated by an electronic flash unit and photographed in the state of stroboscopic photographing under the condition of no external light may correspond to a latent image obtained under the condition of photographing luminance of not more than A+4.5 in terms of EV value.

Further, it is preferable that a guide number of an electronic flash unit, a T-number determined by a camera lens and an diaphragm, and a shutter speed of a shutter unit are set so that a latent image formed on a photographic film when a reference reflection panel positioned at the prescribed distance of 1 m from the lens-fitted film unit is illuminated by an electronic flash unit and photographed in the state of stroboscopic photographing under the condition of no external light may correspond to a latent image obtained under the condition of photographing luminance of not more than A+5.0 (A+4.5 is more preferable) in terms of EV value.

Further, it is more preferable that a guide number of an electronic flash unit, a T-number determined by a camera lens and an diaphragm, and a shutter speed of the shutter unit stated above are set so that a latent image formed on a photographic film when a reference reflection panel positioned at the prescribed distance of 2–3 m from the lens-fitted film unit is illuminated by the electronic flash unit stated above and photographed in the state of stroboscopic photographing under the condition of no external light may correspond to a latent image obtained under the condition of proper exposure amount (reference exposure amount). In the case of an electronic flash unit whose quantity of light gives proper exposure amount to an object composed of a reference reflection panel positioned at the prescribed distance of 2–3 m, a quantity of light of an object positioned at the distance of 1 m which is a close range for photographing becomes A+3 or less in terms of EV value, and it is therefore possible to make an object at the distance of 1 m and an object with low luminance of A−1.5 in terms of EV value to be within a luminance range of latitude of an ordinary photographic paper, and thereby to reproduce both of an object which is within a range of a distance of 1 m or more which makes stroboscopic photographing possible and an object of low luminance background on a print favorably.

Incidentally, "reference exposure amount A' under stroboscopic photographing state" stated above is a value determined by a shutter speed of a shutter unit, a T-number determined by a camera lens and an diaphragm and a speed of a photographic film in the state of stroboscopic photographing. The reference exposure amount mentioned herein is a value obtained by converting to an EV value in the use of a film of ISO 100, and it is expressed by the following expression (1).

$$A'=[\log_{10}F^2+\log_{10}(1/T)-\log_{10}(S/100)]/\log_{10}2 \quad (1)$$

F: T-number determined by a camera lens and an diaphragm under the stroboscopic photographing state
T: Shutter speed of a shutter unit under the stroboscopic photographing state
S: ISO speed of a film On the other hand, reference exposure amount B under the normal photographing state is also determined by the same expression. It is a value determined by a shutter speed of a shutter unit, a T-number determined by a camera lens and an diaphragm and a speed of a photographic film in the state of normal photographing. The reference exposure amount mentioned herein is a value obtained by converting to an EV value in the use of a film of ISO 100, and it is expressed by the following expression (2).

$$B=[\log_{10}F'^2+\log_{10}(1/T')-\log_{10}(S/100)]/\log_{10}2 \quad (2)$$

F': T-number determined by a camera lens and an diaphragm in the state of normal photographing
T': Shutter speed of a shutter unit in the state of normal photographing
S: ISO speed of a film Incidentally, "reference reflection panel" mentioned herein means an 18% reflection plate having reflectance of 18% which is established based on reflectance of a skin of an average person. Further, "a guide number of an electronic flash unit, a T-number determined from a camera lens and a diaphragm, and a shutter speed of a shutter unit are determined so that intensity of a latent image, formed on a photographic film under the condition that a reference reflection panel being placed at a predetermined distance between 2–3 m from the lens-fitted film unit is illuminated by an electronic flash unit and photographed without other lights in the stroboscopic photographing state, corresponds to intensity of a latent image obtained under a photographic condition of photographing luminance not more than A+5.0 in EV value" stated herein means that the position of a reference reflection panel with which a latent image formed on a photographic film when the reference reflection panel is subjected to stroboscopic photographing corresponds to a latent image obtained under the condition of photographing luminance of not more than A+5.0 in terms of EV value may be "on at least one point within a range of 2–3 m from the lens-fitted film unit", and it does not mean that the condition is satisfied when the reference reflection panel is subjected to stroboscopic photographing, in the entire range of 2–3 m from the lens-fitted film unit. Further, "intensity of a latent image, formed on a photographic film under the condition that a reference reflection panel is illuminated by an electronic flash unit and photographed without other lights in the stroboscopic photographing state corresponds to intensity of a latent image obtained under a photographing condition of photographing luminance not more than A+5.0 in EV value" stated herein means that the intensity of the latent image formed on a photographic film when an object with photographing luminance of not more than A+5.0 in terms of EV value is photographed and the intensity of the latent image of the reference reflection panel formed on a photographic film when the reference reflection panel is illuminated by an electronic flash unit and photographed in the state of stroboscopic photographing under the condition of no external light, are mostly the same. This is possible to be taken as that the image densities of photographic films after development are mostly equivalent to each other when each of the photographic films, having the above intensity of the latent image, in the same kind is developed in the same developing condition.

In the present embodiment, it is preferable that EV value A' of the reference exposure amount in the state of stroboscopic photographing is not more than 10, and a range of 4–9.5 is more preferable, a range of 6–9.5 is further preferable, a range of 6–9 is furthermore preferable, and a range of 7–9 is the most preferable. By making the reference exposure amount in the state of stroboscopic photographing to be in the above-mentioned range, it is possible to photograph the background which is darker than that in the past. Further, for example, it is possible to easily obtain a print wherein both a major object at the distance of 2–3 m and a background in a broad room where luminance is not more than EV 8.5 show satisfactory state of exposure. Further, by setting the standard exposure within this range, a camera lens does not need to be one with a large aperture, which is preferable because of cost reduction.

Incidentally, when a focal length of a camera lens is assumed to be 30 mm, it is generally said that a shutter speed of 1/30 or higher speed than that is preferable for preventing camera-shake, and a shutter speed of 1/50 or higher than that is more preferable. Incidentally, the present color negative film with maximum speed is a film of ISO 3200. When this film is loaded under the condition that a shutter speed is made to be 1/30 and a T-number is made to be 5.6, an EV value of reference exposure amount turns out to be 3.9, while when a shutter speed is made to be 1/50 and a T-number is made to be 5.6, an EV value of reference exposure amount turns out to be 6.

Incidentally, in the present embodiment, the reference exposure amount A' in the state of stroboscopic photographing is the same as the reference exposure amount B in the state of normal photographing.

In the present embodiment, it is preferable that a guide number of an electronic flash unit at ISO 100 is made to be 9 or less, and a range of 2–9 is more preferable, a range of 2–8 is further preferable, and a range of 5–8 is furthermore preferable. By making the guide number to be within this range, it is possible to lower the electronic flash light and thereby to prevent over-exposure of a major object. Incidentally, a value of the guide number is expressed herein by the guide number at ISO 100, and when the guide number which is 7 at ISO 100 is converted to that at ISO 800, it is 19.8.

When the guide number satisfies the condition stated above, it is possible to use a capacitor with small capacity, which is preferable. To be concrete, in the electronic flash unit in the present embodiment, it is preferable that the capacity of a main capacitor in the electronic flash unit is within a range of 15 $\mu$F–80 $\mu$F. A range of 50 $\mu$F–80 $\mu$F is more preferable. By making the main capacitor to be within this range, it is possible to shorten the charging time for the electronic flash unit, and further to make a lens-fitted film unit small.

When a capacitor having small capacity as in the foregoing is used as a main capacitor, AAA batteries or N batteries can be used as a battery of an electronic flash unit, and it is possible to make a lens-fitted film unit to be smaller, which is preferable. However, it is also possible to use AA batteries.

When an electronic flash unit whose quantity of light is constant is used as an electronic flash unit, it is possible to reduce cost of a lens-fitted film unit, which is preferable. When it is important to provide an appropriate quantity of light, it is preferable to use an electronic flash unit in which a quantity of light can be varied such as a light-adjustable electronic flash unit.

As a light-adjustable electronic flash unit, those having the following structure, for example, can be used. It is a light-adjustable electronic flash unit having an electronic flash circuit composed of a boosting circuit, an electronic flash light emitting circuit having therein trigger circuit/main capacitor/electronic flash light emitting tube, a light-receiving element which receives light reflected from an object when the electronic flash light emitting tube emits light and generates light-receiving signals, and an electronic flash light emission stopping circuit which stops light emission of the electronic flash light emitting tube based on light-receiving signals of the light-receiving element.

Incidentally, the electronic flash light emission stopping circuit may be either a circuit which cuts the supply of a current from a main capacitor to an electronic flash light emitting tube based on light-receiving signals of the light-receiving element, or a circuit wherein an electronic flash light emission stopping circuit makes a current from a main capacitor to an electronic flash light emitting tube to flow to members other than an electronic flash light emitting tube from a main capacitor.

An embodiment of an automatic light-adjustable electronic flash unit will be explained as follows. The first embodiment of the automatic light-adjustable electronic flash unit will be explained based on a circuit diagram shown in FIG. 7. This embodiment is one having an electronic flash light emission stopping circuit which cuts the supply of a current from a main capacitor to an electronic flash light emitting tube based on light-receiving signals of a light-receiving element. Electronic flash circuit 40 is provided with boosting circuit 41 which raises power supply voltage from battery 121 to the desired voltage necessary for light emission of electronic flash light emitting tube 31, electronic flash light emitting circuit 42 which charges high voltage coming from the boosting circuit 41 on main capacitor 124 and makes electronic flash light emitting tube 2 to emit light, and electronic flash light emission stopping circuit 43 which controls, in the course of stroboscopic photographing, the exposure of electronic flash light emitting tube 31 automatically by using light-receiving element 125 and by taking in reflected light from an object.

The electronic flash light emitting circuit 42 is further combined with the above-mentioned main capacitor 124, the electronic flash light emitting tube 31 and with trigger circuit 44 which excites light emission of the electronic flash light emitting tube 31 in synchronization with pressing operation for a shutter-release button. Each of the boosting circuit 41 and trigger circuit 44 is a combination of a printed wiring used for a known lens-fitted film unit with a built-in electronic flash unit and electric parts for electronic flash, while a transformer is incorporated in the boosting circuit 31 as an electric part for electronic flash, and a trigger coil and a trigger switch are incorporated in the trigger circuit 44 as electric parts for electronic flash.

The electronic flash light emission stopping circuit 43 is provided with thyristor 50 which controls light emission of the electronic flash light emitting tube 31 and with photometric circuit 45 which generates output signals when light-receiving element 125 of a reflected light receiving section receives reflected light greater than prescribed value. This photometric circuit 45 is composed of the light-receiving element 125, integrating capacitor 51 which is connected in series with the light-receiving element 125, small capacity capacitor 52 which is connected in parallel with the light-receiving element 125 and of transistor 53. Thus, reflected light from an object taken in the light-receiving element through a lighting hole of the reflected light receiving section is converted into a light-receiving signal which is then integrated by integrating capacitor 51, and when the integrated value reaches the prescribed value, the transistor 53 is operated so that output signals may be generated from the photometric circuit 45.

Power supply to photometric circuit 36 is conducted by resistor 54 connected in parallel with electronic flash light emitting tube 31 and thyristor 50, capacitor 55 and by Zener diode 56, and when voltage is generated on the Zener diode 56 by light emission of the electronic flash light emitting tube 31, integrating capacitor 51 is charged slightly from small capacity capacitor 52 so that rise of integration by the electronic flash light emitting tube 31 thereafter may be improved.

Transistor 53 operates when the integrated value reaches the prescribed value as stated above, and output signals are generated from photometric circuit 45. The output signals from the photometric circuit 45 enter the gate of thyristor 57 which turns off thyristor 50, and operate the thyristor 57, then make communication capacitor 58 to be discharged, and supply reverse voltage to the thyristor 50. As a result, supply of an electric current from main capacitor 124 to the electronic flash light emitting tube 31 is cut and light emission of the electronic flash light emitting tube 31 is stopped.

In the present example, in the case of stroboscopic photographing employing an electronic flash unit, reflected light from an object is received by light-receiving element 125 in a reflection light receiving section, and when the reflected light exceeds the prescribed value, light emitting operation of electronic flash light emitting tube 31 is stopped automatically by electronic flash light emission stopping circuit 43, as stated above. Therefore, even in the case of stroboscopic photographing which is conducted with distance shorter than efficiency of the guide nimbler of the electronic flash unit, it is possible to obtain a photograph with appropriate exposure which is free from over-exposure. Further, the structure is relatively simple and no expensive CPU is used, which makes it possible to execute at low cost.

Figure 8:
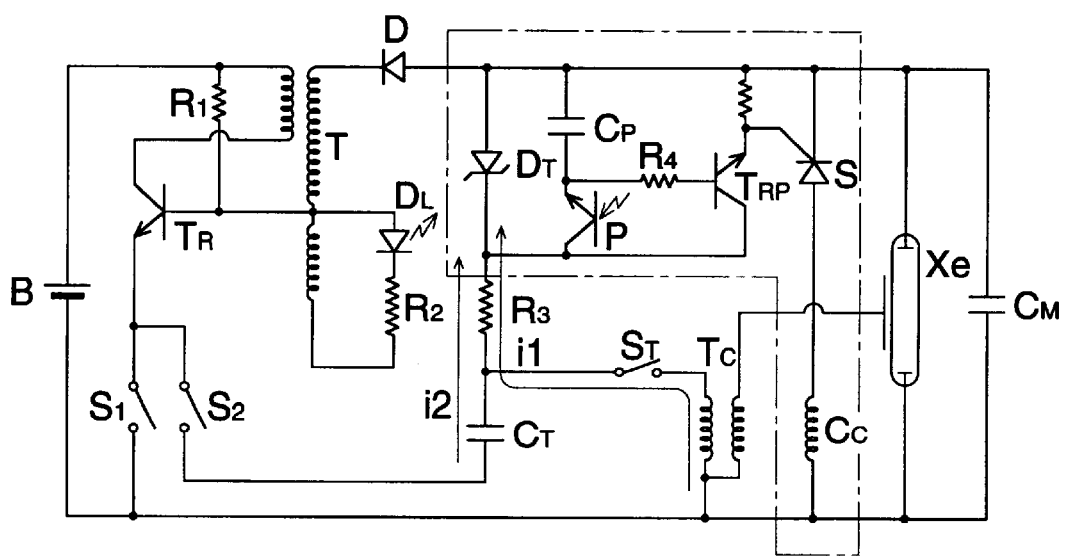
FIG. 8 is a circuit diagram of the second example of an automatic light-adjusting electronic flash unit.

Next, the second embodiment of an automatic light-adjustable electronic flash unit will be explained as follows, referring to the circuit diagram shown in FIG. 8. This embodiment is one having an electronic flash light emission stopping circuit which makes a current from a main capacitor to an electronic flash light emitting tube to flow to members other than the electronic flash light emitting tube from the main capacitor based on light-receiving signals of a light-receiving element. In FIG. 8, when main switches S1 and S2 are turned on by external operations, an electric current of battery B flows to transistor TR through resistor R1, then, oscillation is started, and the secondary side of oscillation transformer T is raised to high voltage of 300–350 V. An electric current of the secondary side is rectified by diode D to charge trigger capacitor CT connected in series with resistor R3 and main capacitor CM. When the main capacitor CM is charged to the prescribed voltage, light-emitting diode DL connected in series with resistor R2 is lit.

In the case of photographing, trigger switch ST is turned on, interlocking with an opening operation of a shutter. Due to this, a closed circuit is formed by trigger capacitor CT, trigger switch ST, a primary side of trigger transformer TC and main switches S1 and S2, and electric charges in the trigger capacitor CT are discharged to the primary side of the trigger transformer TC. As a result, further high voltage is generated on the secondary side of the trigger transformer TC and is impressed on a trigger electrode of xenon tube Xe. Therefore, ionized xenon atoms in the xenon tube Xe come into collision with electrons flying out of a cathode, and are excited, thus the xenon tube Xe is caused by discharge of main capacitor CM to emit light.

When the trigger capacitor CT is discharged, electric current i1 flows to resistor R3 through the primary side of the trigger transformer TC, and further, electric current i2 flows to resistor R3 to charge the trigger capacitor CT. In the present embodiment, resistor R3 and Zener diode DT wherein a side of the resistor R# is made to be a cathode are connected in series, thereby, electric current I which is the sum of electric current i and electric current i2 flows to Zener diode DT.

In this case, photosensor P representing a light-receiving element connected in series and capacitor CP are connected in parallel with Zener diode DT. A connecting portion between photosensor P and capacitor CP is connected with a base of transistor TRP through resistor R4, and an emitter of the transistor TRP is connected with a gate of thyristor S. The thyristor S is connected in series with choke coil CC which serves as a damper, and these are connected in parallel with the xenon tube Xe.

When electric current I flows to Zener diode DT and voltage is generated thereon, an electric current flows to photosensor P in accordance with intensity of electronic flash light reflected on an object. When an object distance is short, intensity of electronic flash light reflected on an object is high, and intensity of an electric current flowing to photosensor P is high. Therefore, capacitor CP is charged quickly. On the other hand, when an object distance is long, intensity of electronic flash light reflected on an object is low, and intensity of an electric current flowing to photosensor P is low. When thyristor S is turned on, therefore, an electric current which is more than that flowing to xenon tube Xe flows to choke coil CC, thus, charges in main capacitor CM are consumed quickly, and light emission of the xenon tube Xe is stopped.

In the case of the light-adjustable electronic flash unit having the above-mentioned structure, it is further preferable that the structure is as follows. An electronic flash circuit has a printed board having on its one side a printed circuit pattern, and there is provided on the print board a light-receiving element wherein at least its light-receiving surface is exposed from the side where a circuit pattern of the print board is printed. It is more preferable that an illuminating hole which is for taking in light reflected from an object is provided at the position to face the light-receiving surface of the light-receiving element on the front cover which covers at least a part of the electronic flash circuit.

Further, in the case of the light-adjustable electronic flash unit, it is preferable that the guide number is not more than 12 at full emission of light. The more preferable is 9 or less.

It is further preferable that T-number determined by a camera lens and an diaphragm in the state of stroboscopic photographing (which is the same as that in the state of normal photographing, in the present embodiment) is not more than 11. The more preferable is not more than 10, the further preferable is not more than 9, and the more preferable is within a range from 4 to 8.9. The more preferable is from 5.6 to 8.6, and further preferable is from 6 to 8. The most preferable is within a range from 6 to 7.5. By making the T-number to be within this range, darker backgrounds can also be photographed. It is further possible to make capacity of a capacitor of an electronic flash unit to be small.

Incidentally, the T-number is a value obtained by giving consideration of the number of lenses and their materials to F-number, and it is a value determined by the following conditional expression (3) unconditionally in the system of a camera lens and an diaphragm.

$$T\text{-number} = F\text{-number}/\sqrt{t} \tag{3}$$

in which t represents permeability of the lens.

The relationship between the F-number and the T-number in the present embodiment is expressed by the following conditional expression (4) for convenience, because of the assumption that a two-element plastic lens is used in the present embodiment; However, this expression is naturally changed if the number of lenses and materials are changed.

$$T\text{-number} \approx 1.085 \times F\text{-number} \tag{4}$$

Incidentally, T-number in the case where a camera lens is a one-element plastic lens can be obtained favorably by the following conditional expression (5).

$$T\text{-number} \approx 1.041 \times F\text{-number} \tag{5}$$

Further, it is preferable that a focal length of the camera lens is within a range from 28 mm to 35 mm. The more preferable is a range of 28 mm–33 mm. With regard to the angle of field, it is preferable that it is one corresponding to the focal length 28–35 mm in the case of a 135 film. The more preferable is the angle of field corresponding to the focal length 28–33 mm. By keeping this range, it is not necessary to make an electronic flash unit to be of a large capacity to secure a quantity of light on a peripheral portion of a photographing range, because the photographing range is not a wide angle, thus, it is possible to make capacity of a main capacitor to be small, and a distance range which makes well-focused photographing possible is extended.

It is further preferable that a camera lens is composed of two or one plastic lens. Further, for the purpose of cost reduction and easy security of well-balanced exposure, it is preferable that a lens-fitted film unit is of single focal length, but focal length switching is also acceptable.

Further, preferable conditions for a camera lens will be explained as follows by using an F-number. When assuming that a camera lens is composed of two lens components and an diaphragm, and $F_o$ represents open aperture F-number of the camera lens, it is preferable that the following conditional expression (6) is satisfied. Incidentally, the open aperture F-number is the F-number corresponding to the fully opened aperture in the lens-fitted film unit.

$$5.6 < F_o < 8 \tag{6}$$

The more preferable is that the following conditional expression (7) is satisfied when ω represents half angle of view of a camera lens and f represents a focal length.

$$5 < f/(F_o \cdot \tan \omega) < 7 \tag{7}$$

The further preferable is that the following conditional expression (8) is satisfied by F-number of a camera lens when SA(F) represents spherical aberration of marginal ray of F and $y_L$ represents a half of the length of photographed image plane in its longitudinal direction.

$$-0.072 y_L < SA(F_o/0.7) < -0.024 y_L \tag{8}$$

The conditional expressions stated above will be explained. First, when conditional expression (6) is satisfied, exposure can be obtained sufficiently despite a low luminance object, various aberrations including spherical aberration can be corrected sufficiently despite two lenses, the depth of focus is not too short, and influences of errors in curvature of the field and a back focus in manufacturing of assembling error.

In the case of a camera lens composed of three lenses, when no antireflection coating is provided on each lens, the rate of transmitted light is about 79% of incident light, and the rate of flare light reaching an image plane after two reflections on refraction surfaces is 2.2% of the flare light, which is not preferable. To avoid this, it is necessary to provide antireflection coating on at least one lens, and cost increase is unavoidable. On the other hand, when a camera lens is composed of two lenses, transmitted light is 85% without antireflection coating, and flare light is about 0.86% of the transmitted light, which is sufficient. Therefore, a camera lens composed of two lenses is appropriate as a camera lens for lens-fitted film unit on the points of cost and lens performance.

The conditional expression (7) represents conditions for obtaining sufficient depth of field as a lens-fitted film unit of a fixed focal point type. When the conditional expression (7) is satisfied, depth of field is not too short, the lens is not of too wide angle, insufficiency of brightness of the edge of image field caused by an influence of a law of fourth power of cosine is not caused, and an effect of perspective does not become too great. Therefore, natural photographs can be obtained through photographing, which is preferable.

It is preferable that the conditional expression (8) is satisfied for a camera lens when correction of spherical aberration is insufficient. When the conditional expression (8) is satisfied, over correction of spherical aberration is not caused, a central focus position is not too close to an ideal image plane position, and a difference between the central focus position and a focus position of a light flux outside an optical axis, namely, an influence of curvature of the field is not too great, which is preferable.

Incidentally, in the state of stroboscopic photographing, it is preferable that a shutter speed of a shutter unit and T-number determined by a camera lens and an diaphragm are not changed, and even in the case of normal photographing, it is preferable that a shutter speed of a shutter unit and T-number determined by a camera lens and an diaphragm are not changed.

In the state of stroboscopic photographing, it is preferable that a shutter speed of a shutter unit is within a range of 1/130–1/30, a range of 1/100–1/30 is more preferable, a range of 1/90–1/50 is further preferable, and a range of 1/80–1/50 is further preferable. (The greater, the value is, the lower the speed is. In other words, the shutter speed of 1/30 is slower than that of 1/130.)

Further, it is preferable that shutter speed T of a shutter unit and guide number G of an electronic flash unit at ISO 100 in stroboscopic photographing state satisfy the following expression (9).

$$G^2/T < 8000 \tag{9}$$

When the expression (9) is satisfied, it is more easy to satisfy the condition that "A is not more than 8.5 when A represents EV value of reference exposure amount—1.5 in the state of stroboscopic photographing, and a latent image formed on a photographic film when a reference reflection panel positioned at the prescribed distance of 2–3 m from the lens-fitted film unit is illuminated by an electronic flash unit and photographed in the state of stroboscopic photographing under the condition of no external light is the same as a latent image obtained under the condition of photographing luminance of not more than A+5.0 in terms of EV value", which is preferable. Therefore, in stroboscopic photographing in a broad room or in the outdoors where illumination is poor, a background does not appear to be dark on a photograph, which is different from the conventional lens-fitted film unit with a built-in electronic flash unit.

A value of $G^2/T$ which is more preferable is less than 6500 and the value which is furthermore preferable is less than 5000. Further, it is preferable that guide number G of an electronic flash unit at ISO 100 and T-number F determined from the camera lens and the diaphragm in stroboscopic photographing state satisfy the following expression (10).

$$2F \leq G \leq 3F \tag{10}$$

In the lens-fitted film unit of the present embodiment, the lowest photographing luminance with which a latent image capable of forming an image on an image carrier on which a visible image is formed finally can be formed on a photographic film through photographing conducted with T-number and shutter speed for the state of stroboscopic photographing and without electronic flash light of an electronic flash unit, is not more than 8.5, and a guide number of the electronic flash unit, T-number determined by a camera lens and an diaphragm and s shutter speed of a shutter unit are determined so that a luminance difference on the photographic film between a reference reflection panel and a background may be within a range of latitude of the photographic film which makes it possible to form an image finally within a range of latitude of an image carrier, when a reference reflection panel positioned at the prescribed distance of 2–3 m from the lens-fitted film unit is illuminated by electronic flash light of the electronic flash unit and photographed together with a background having the lowest photographing luminance in the state of stroboscopic photographing.

As an image carrier forming a visible image finally, a photographic paper is preferable, but it may also be an ink jet printer paper, an electrostatic color printer paper, or thermosensitive paper. Incidentally, as a method of forming an image on an image carrier finally, it is possible to expose a photographic paper through a photographic film which has been exposed and developed to print an image on the photographic paper. Or, it is also possible to convert image information on an exposed photographic film into digital data, and then, to print an image on a photographic paper with a laser beam based on the digital data, or to form an image on an ink jet printer paper or on an electrostatic color printer paper with an ink jet printer or with an electrostatic color printer.

When printing an image on a photographic paper by exposing it through a developed photographic film, "within a latitude of said image carrier that said image is able to be formed" means a range of latitude corresponding to latitude of a photographic paper. Further, when forming an image on an ink jet printer paper with an ink jet printer or an image on a photographic paper with a digital printer, after converting image data on a photographic film into digital data temporarily, "within a latitude of said image carrier that said image is able to be formed" may either mean a range of latitude corresponding to latitude of an image formed by an ink jet printer, or mean a range of latitude corresponding to latitude of photographic paper or mean a range of latitude which can be compressed, when latitude is compressed in the course of converting image data on a photographic film into digital data.

In other words, in the image forming method mentioned above, each image forming method has its own range of latitude which makes image forming possible, when forming an image finally on an image carrier. Therefore, photographing conditions which make it possible to form a satisfactory latent image on a photographic film are established for a lens-fitted film unit with an electronic flash unit, so that the above-mentioned reference reflection panel and a low luminance background may be within a range of latitude which makes it possible to form an image when forming an image finally.

For example, since latitude of an ordinary photographic paper representing an image carrier which forms an image finally is narrow compared with latitude of a photographic film housed in a lens-fitted film unit, there has been a problem that when exposure is adjusted to be appropriate for a high luminance object on a photographic film, an image of a low luminance object can not be formed, while, when exposure is adjusted to be appropriate for a low luminance object on a negative film an image of a high luminance object turns out to be white. In this case, if it is possible to establish photographing conditions so that images on a photographic film may be covered within a range of latitude of an image carrier such as a photographic paper, it is possible to form well-balanced images of a low luminance object and a high luminance object constantly on a photographic film and even on an image carrier such as a photographic paper. Further, the meaning of "a minimum photographing luminance, which enables latent image forming on said photographic film by which an image is able to be formed on an image carrier" can be taken as the minimum photographic luminance which provides a characteristic curve when a photographic film of the same kind as that in the unexposed lens-fitted film unit is exposed with a predetermined amount of light with a light modulator for providing various luminance such as an optical wedge, and the photographic film is developed.

A preferable example in the first embodiment will be shown below, by the use of numerical values. In the present embodiment, a shutter speed and a T-number in the state of stroboscopic photographing are the same as those in the state of normal photographing. For example, there is given, as a preferable example, a lens-fitted film unit wherein a built-in photographic film is a 135 film with a speed of ISO 800, a shutter speed is $\frac{1}{80}$, a T-number is 6.7 and a guide number of an electronic flash unit is 7. As a camera lens, a two-element plastic lens having a focal length of 30 mm is used. In this case, reference exposure amount A' is 8.8, an object distance appropriate for electronic flash is 3.0 m, an object distance critical to electronic flash is 5.1 m, the lowest EV value of a background which makes it possible to photograph is 7.3, and an EV value in stroboscopic photographing for an object at an object distance of 1 m is 11.5. Incidentally, a value of $G^2/T$ is 3920. Therefore, it is possible to photograph in the dark place, and a background and a main object can be photographed in good balance. In addition, a sufficient object distance can be obtained in spite of using a small-sized electronic flash unit having a guide number smaller than a conventional one, namely, an electronic flash unit with smaller quantity of light.

(Second Embodiment)

The second embodiment of the lens-fitted film unit with a built-in electronic flash unit will be explained as follows, referring to FIGS. 1–4.

Incidentally, in the first embodiment, a shutter speed and a T-number in the state of normal photographing are the same as those in the stroboscopic photographing. In the lens-fitted film unit of the present embodiment, however, a T-number determined by a camera lens and an diaphragm in the state of normal photographing is different from that in the state of stroboscopic photographing. This is only difference between the first embodiment and the second embodiment, and other parts are the same and common between them. Explanation of the common parts will be omitted here.

In the lens-fitted film unit in the present embodiment, a T-number in the state of stroboscopic photographing is different from that in the state of normal photographing, and the T-number in the state of stroboscopic photographing is smaller than that in the state of normal photographing.

Owing to the structure stated above, it is possible to obtain a lens-fitted film unit wherein it is possible to photograph favorably at the bright place such as the outdoors in the daytime in the state of ordinary photographing, and to photograph at dark outdoors or in the room with well-balanced luminance for both a background and a main object.

Incidentally, as a method to change a T-number when switching between the state of normal photographing and the state of stroboscopic photographing, it is preferable to use a method employing an aperture switching mechanism which moves interlocking with an electronic flash switching lever representing a switching means which switches between the use and non-use of an electronic flash unit, and switches the aperture diameters. Two embodiments of the aperture switching mechanism will be explained in detail as follows.

The first embodiment of the aperture switching mechanism will be shown. As an aperture switching mechanism, there is used an aperture member which is provided between a camera lens and a photographing plane of a photographic film and has a plate having thereon two holes each being different each other in terms of size as shown on the perspective view in FIG. 3. The numeral 11 represents an aperture plate on which two through holes including large aperture 11a and small aperture 11b are provided at almost central portion, and in FIG. 3, the large aperture 11a is positioned behind camera lens 1 to form an open aperture.

On right arm 11c of aperture plate 11, there is fixed electronic flash switching lever 4 shown in FIG. 1, and two elongated holes 11d provided in the lateral direction of the aperture plate 11 engage with guide pins 12 planted on the fixed item such as a unit main body. Therefore, the aperture plate 11 is caused by sliding movement of the electronic flash switching lever 4 to slide from side to side. At the lower portion of the aperture plate 11, there are provided reverse V-shaped cutouts 11e and 11f with which the reverse V-shaped tip portion of leaf spring 13 is in pressure contact to form a click stop device, thus, the aperture plate 11 is positioned at two locations.

Figure 3:
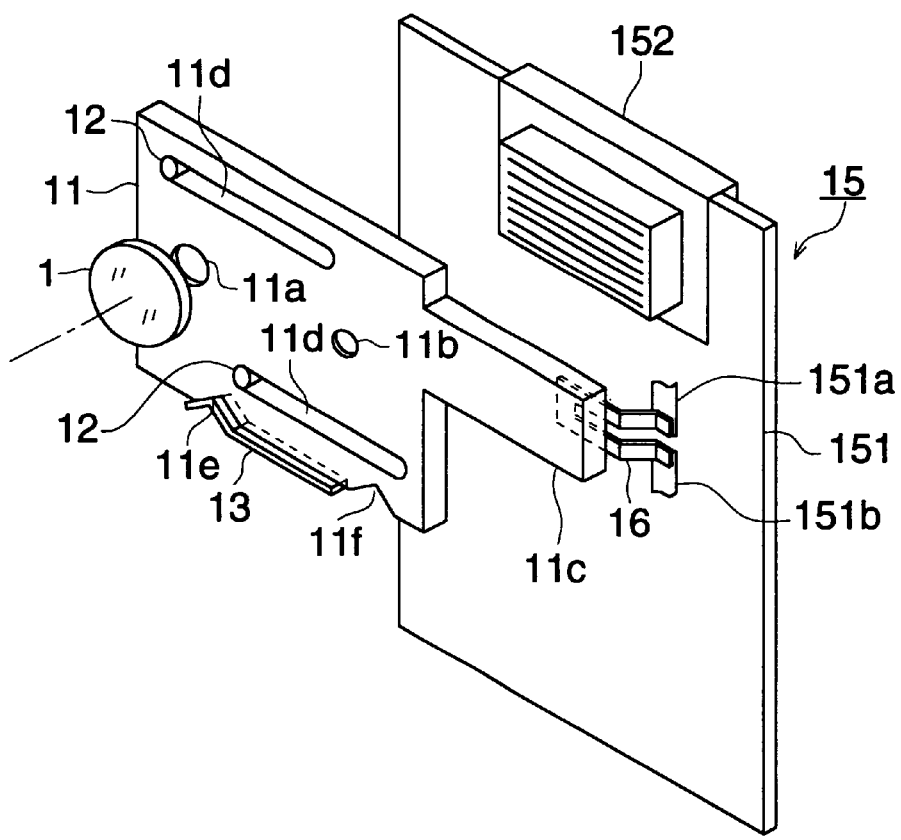
FIG. 3 is a perspective view of the first example of the structure to switch a diaphragm plate.

The numeral 15 represents an electronic flash unit, 151 represents a print board provided with an electronic flash circuit, and 152 represents an electronic flash light emitting section which emits electronic flash light to illuminate with electronic flash light from electronic flash light emitting panel 3. An arm section 11c of the aperture plate 11, is provided so that the reverse side of arm section 11c makes a pressure contact against contact plate 16 whose base portion is fixed to the print board and tip portion forks into two branches to operate as a main switch of the electronic flash unit. In FIG. 3, the tip portion of the contact plate 16 is in contact with both of conductive patterns 151a and 151b forming a main switch on the print board 15, thus, the conductive patterns 151a and 151b are connected electrically, and the main switch is turned on. Therefore, charging for electronic flash is conducted to make stroboscopic photographing possible and an aperture is large aperture 11a representing an open aperture, thus, a value of T-number is small compared with the state of ordinary photographing, and a sufficient object distance can be obtained for stroboscopic photographing.

Next, the electronic flash switching lever 4 is slid and the aperture plate 11 is slid to the left. Then, the aperture plate 11 is stopped with the reverse V-shaped tip portion of the leaf spring 13 being in pressure contact with cutout 11f, and small aperture 11b is positioned behind camera lens 1. Since the tip portion of the contact plate 16 leaves the conductive patterns 151a and 151b on the print board 151 by releasing the pressure, electrical connection between the conductive patterns 151a and 151b is cut, and the main switch is turned off, resulting in the appropriate photographing state for high luminance photographing such as one in the daytime.

The second embodiment of the aperture switching mechanism will be explained next. In the perspective view of FIG. 4, aperture plate 21 is arranged behind camera lens 1. On the right end portion 21a of the aperture plate 21, there is fixed electronic flash switching lever 4 shown in FIG. 1, and when the electronic flash switching lever 4 is operated to slide from side to side, the aperture plate 21 also slides from side to side. On the lower portion of the right end portion 21a, there is provided main switch 22 of electronic flash unit, and on the lower portion of the aperture plate 21, there is provided cam 21b. Further, on the aperture plate, there is provided aperture hole 21c having a small diameter.

Therefore, when the aperture plate 21 is slid toward the left and the aperture hole 21c having a small diameter is brought to the rear of camera lens 1 accordingly, the cam 21b is retreated from main switch 22, and thereby, movable contact flake 22a and fixed contact flake 22b of main switch 22 do not touch each other, and main switch 22 is turned off. Namely, this condition represents the state of ordinary photographing in high luminance wherein the electronic flash light is not emitted and stroboscopic photographing is not conducted. Compared with stroboscopic photographing, a T-number in normal photographing is large.

On the other hand, when the aperture plate 21c is retreated from the rear of camera lens 1 by sliding the aperture plate 21 toward the right side, fixed aperture hole 23a having a large diameter provided on fixed aperture plate 23 serves as an aperture, and cam 21b presses movable contact flake 22a of main switch 22, thus, the movable contact flake 22a comes in pressure contact with fixed contact flake 22b and main switch 22 is turned on. Namely, this represents the state of stroboscopic photographing wherein electronic flash light is emitted.

Figure 4:
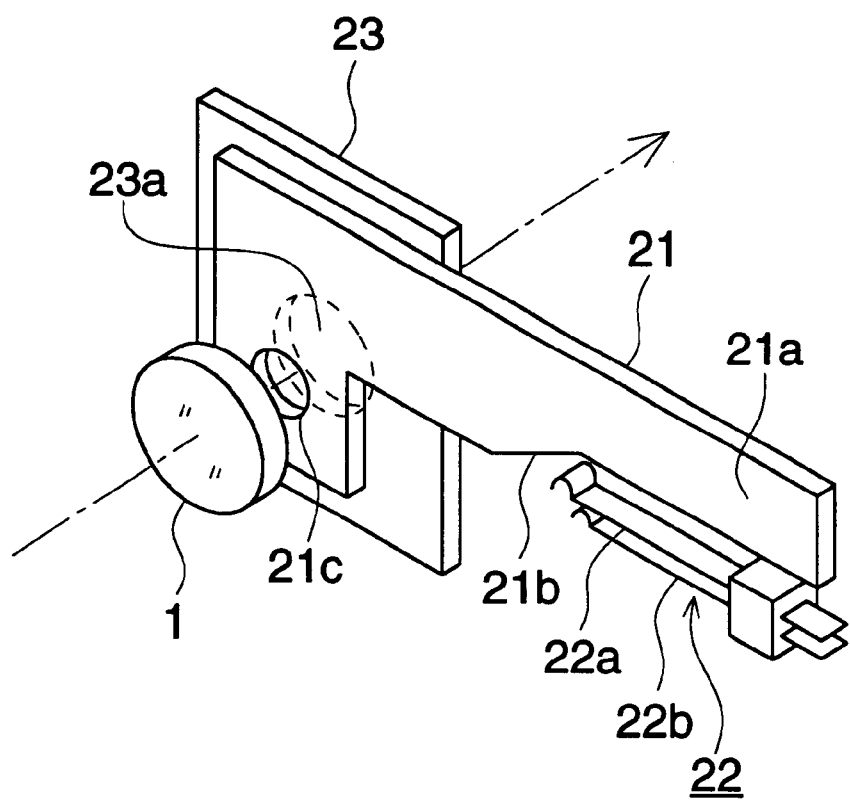
FIG. 4 is a perspective view of the second example of the structure to switch a diaphragm plate.

Incidentally, compared with the aperture switching mechanism shown in FIG. 4, the aperture switching mechanism using a panel member which has thereon two holes and determines a size of an aperture depending on the size of the hole as shown in FIG. 3 is preferable because it can make the resolution on the peripheral portion to be better.

Though an example wherein an aperture is located behind a camera lens is shown in the drawings in the present embodiment, an aperture member may also be arranged between a first lens and a second lens, when a camera lens is composed of the first lens and the second lens.

The lens-fitted film unit in the second embodiment is also the one wherein a guide number of an electronic flash unit, a T-number determined by a camera lens and an diaphragm, and a shutter speed of a shutter unit are determined so that A is not more than 8.5 when A represents EV value of reference exposure amount of lens-fitted film unit—1.5 in the state of stroboscopic photographing, and intensity of a latent image formed on a photographic film when a reference reflection panel positioned at the prescribed distance of 2–3 m from the lens-fitted film unit is illuminated by an electronic flash unit and photographed in the state of stroboscopic photographing under the condition of no external light may correspond to intensity of a latent image obtained under the condition of photographing luminance of not more than A+5.0 in terms of EV value. More preferable conditions will be omitted here because they are the same as those in the first embodiment.

In the present embodiment, it is preferable that an EV value A' of reference exposure amount in the state of stroboscopic photographing is not more than 10, the more preferable is a range from 4 to 9.5, the still more preferable is a range from 6 to 9.5, the further preferable is a range from 6 to 9, and the most preferable is a range from 7 to 9. When the reference exposure amount in the state of stroboscopic photographing is made to be within the range stated above, it is possible to photograph the background which is darker than the conventional one.

In the present embodiment, the T-number in the state of stroboscopic photographing is different from that in the state of normal photographing, and the standard exposure in the state of stroboscopic photographing is different from that in the state of normal photographing accordingly, which is different from the first embodiment. In the present embodiment, it is preferable that EV value B of the reference exposure amount in the state of normal photographing satisfies the following expression (11).

$$A'+1<=B \tag{11}$$

The more preferable is to satisfy the following expression (12). The still more preferable is to satisfy the following expression (13).

$$A'+1<=B<=A'+4 \tag{12}$$

$$A'+1<=B<=A'+3 \tag{13}$$

Further, it is preferable that reference exposure amount B in the state of normal photographing satisfies the condition of the range from 9 to 13 while satisfying the expressions stated above. The more preferable is a range from 10 to 13, and the further preferable is a range from 10.5 to 13. When the standard exposure in the state of ordinary photographing satisfies the range mentioned above, photographing under high luminance such as photographing in the outdoors under fine weather can be conducted satisfactorily. It is further possible to photograph satisfactorily in the outdoors under cloudy weather.

Incidentally, with regard to reference exposure amount A' in the state of stroboscopic photographing and standard exposure B in the state of ordinary photographing, the most preferable ranges for them are from 7 to 9 for A' and from A'+1 to A'+3 for B.

Preferable conditions for the guide number of the electronic flash unit and for the capacitor will be omitted here, because they are the same as those in the first embodiment.

In the present embodiment, a T-number determined by a camera lens and a diaphragm in the state of stroboscopic photographing is different from that in the state of normal photographing, and the T-number in the state of normal photographing is larger.

It is preferable that a T-number in the state of stroboscopic photographing is not more than 11. The more preferable is not more than 10, the still more preferable is not more than 9, the still further preferable is from 4 to 8.9, the preferable moreover is from 5.6 to 8.6, the preferable furthermore is from 6 to 8, and the most preferable is from 6 to 7.5. When this range is kept, it is possible to photograph the background which is more dark. It is also possible to make capacity of a capacitor of an electronic flash unit small.

It is further preferable that a T-number in the state of normal photographing is in a range from 9 to 14. The more preferable is a range from 10 to 14. When this range is kept, it is possible to photograph satisfactorily under high luminance in the outdoors at daytime.

Preferable focal length and material of a camera lens will be omitted here because they are the same as those in the first embodiment.

Incidentally, more preferable conditions for the camera lens and diaphragm in the second embodiment will be explained as follows, using an F-number. When $F_o$ represents an F-number of a camera lens in the state of stroboscopic photographing and $F_{off}$ represents an F-number of a camera lens in the state of normal photographing, it is preferable that the following expression (14) is satisfied.

$$0.4 < F_o/F_{off} < 0.7 \tag{14}$$

It is more preferable that the conditional expression (14) is satisfied, and the following conditional expression (15) and the aforesaid conditional expression (8) are satisfied when SA(F) represents spherical aberration of marginal light where an F-number of a camera lens is F and when $Y_L$ represents a half of the length of photographed image plane in its longitudinal direction.

$$-0.008 F_{off} \cdot y_L < SA(F_o) < -0.003 F_{off} \cdot y_L \tag{15}$$

The conditional expressions mentioned above will be explained. When F-number of a lens is changed so that the conditional expression (14) may be satisfied, no overexposure is caused even in the outdoors under fine weather where object luminance is high, and F-number is small in the outdoors where object luminance is insufficient, thereby, electronic flash light can reach sufficiently even when a guide number of an electronic flash unit is small, and exposure for an object which is farther than a background can also be obtained sufficiently.

Further, when both conditional expressions (14) and (8) are satisfied, various aberrations under an open aperture can be corrected satisfactorily as stated above.

Further, when conditional expressions (6), (14) and (15) are satisfied, it is possible to obtain an appropriate depth of field for both use and non-use of an electronic flash unit. Further, an amount of spherical aberration in F-number $F_o$ at open aperture turns out to be appropriate, an amount of displacement of the best position of focus point resulted when stopping down to $F_{off}$ also turns out to be appropriate, and resolution of a close object and that of a distant object both resulted when stopping down to $F_{off}$ are improved even when an adjustment is made so that the depth of field is within a range wherein auxiliary light of electronic flash light reaches sufficiently in the case of open aperture, which is preferable.

In the present embodiment, a shutter speed of the shutter unit is invariable, and s preferable condition of the shutter speed is a range from 1/100 to 1/60, and a condition which is more preferable is a range from 1/100 to 1/70.

Incidentally, in the present embodiment, a T-number determined by a camera lens and an diaphragm is changed when switching between the state of stroboscopic photographing and the state of normal photographing. However, it is preferable that the shutter speed and the T-number are invariable in each of the state of stroboscopic photographing and the state of normal photographing.

It is preferable that expression (9) and (10) are satisfied even in the present embodiment. The value which is more preferable is the same as that in the first embodiment, and it is omitted here accordingly.

In the present embodiment, it is preferable that the following conditional expressions (16) and (17) are satisfied, when M24 represents MTF of the camera lens in the vicinity of an optical axis in spatial frequency of 15.00 lines/mm at the T-number in the state of stroboscopic photographing in case of an object distance of 4 m, and M22 represents MTF of the camera lens in the vicinity of an optical axis in spatial frequency of 15.00 lines/mm at the T-number in the state of stroboscopic photographing in case of an object distance of 2 m.

$$0.1 < M24 \tag{16}$$

$$0.1 < M22 \tag{17}$$

The more preferable is to satisfy expression (18).

$$0.2 < M22 \tag{18}$$

The more preferable is to satisfy expression (19)

$$M24 < M22 \tag{19}$$

Further, when M2A represents MTF of the camera lens in the vicinity of the optical axis, for a special frequency of 15 lines in T-number of the stroboscopic photographing state at the infinite distance to the object, the more preferable is to satisfy expression (20)

$$M2A \leq 0.25 \tag{20}$$

In the lens-fitted film unit of the present embodiment again, the lowest photographing luminance with which a latent image capable of forming an image on an image carrier on which a visible image is formed finally can be formed on a photographic film through photographing conducted with T-number and shutter speed for the state of stroboscopic photographing and without electronic flash light of an electronic flash unit, is not more than 8.5, and a guide number of the electronic flash unit, T-number determined by a camera lens and an diaphragm and s shutter speed of a shutter unit are determined so that a luminance difference on the photographic film between a reference reflection panel and a background may be within a range of latitude of the photographic film which makes it possible to form an image finally within a range of latitude of an image carrier, when a reference reflection panel positioned at the prescribed distance of 2–3 m from the lens-fitted film unit is illuminated by electronic flash light of the electronic flash unit and photographed together with a background having the lowest photographing luminance in the state of stroboscopic photographing.

Explanation of the image carrier on which a visible image is formed finally will be omitted here, because it is the same as that in the first embodiment.

A preferable example in the second embodiment will be shown below, by the use of numerical values. In the present embodiment, a shutter speed in the state of stroboscopic photographing is the same as that in the state of ordinary photographing but a T-number in the state of stroboscopic photographing is different from that in the state of ordinary photographing. For example, there is given, as a preferable example, a lens-fitted film unit wherein a built-in photographic film is a 135 film with a speed of ISO 800, a shutter speed is $1/80$, a T-number in the state of stroboscopic photographing is 6.7, a T-number in the state of ordinary photographing is 12.3, and a guide number of an electronic flash unit is 7. The mechanism shown in FIG. 3 is used as an aperture switching mechanism. A two-element plastic lens is used as a camera lens. In this case, reference exposure amount A' in the state of stroboscopic photographing is 8.8, reference exposure amount B in the state of normal photographing is 10.6, an object distance appropriate for electronic flash is 3.0 m, an object distance critical to electronic flash is 5.1 m, the lowest EV value of a background which makes it possible to photograph is 7.3, and an EV value in stroboscopic photographing for an object at an object distance of 1 m is 11.5. Therefore, it is possible to photograph in the dark place, and a background and a main object can be photographed in good balance. Further, a sufficient object distance can be obtained in spite of using a small-sized electronic flash unit having a guide number smaller than a conventional one, namely, an electronic flash unit with smaller quantity of light. In addition, it is further possible to photograph satisfactorily under the condition of high luminance such as the luminance in the outdoor in the daytime.

Another preferable example in the second embodiment will be shown below, by the use of numerical values. For example, there is given, as an example, a lens-fitted film unit wherein a built-in photographic film is a 135 film with a speed of ISO 800, a shutter speed is $1/80$, a T-number in the state of stroboscopic photographing is 7.3, a T-number in the state of ordinary photographing is 13.4, and a guide number of an electronic flash unit is 7. The mechanism shown in FIG. 4 is used as an aperture switching mechanism. A two-element plastic lens is used as a camera lens. In this case, reference exposure amount A' in the state of stroboscopic photographing is 9.1, reference exposure amount B in the state of normal photographing is 10.9, an object distance appropriate for electronic flash is 2.7 m, an object distance critical to electronic flash is 4.6 m, the lowest EV value of a background which makes it possible to photograph is 7.6, and an EV value in stroboscopic photographing for an object at an object distance of 1 m is 12.1. Therefore, it is possible to photograph in the dark place, and a background and a main object can be photographed in good balance. Further, a sufficient object distance can be obtained in spite of using a small-sized electronic flash unit having a guide number smaller than a conventional one, namely, an electronic flash unit with smaller quantity of light. In addition, it is further possible to photograph satisfactorily under the condition of high luminance such as the luminance in the outdoor in the daytime.

(Third Embodiment)

The third embodiment of the lens-fitted film unit with a built-in electronic flash unit will be explained as follows, referring to FIGS. 1, 2, 5 and 6.

Incidentally, in the first embodiment, a shutter speed and a T-number in the state of normal photographing are the same as those in the stroboscopic photographing. In the lens-fitted film unit of the present embodiment, however, a shutter speed of the shutter unit in the state of normal photographing is different from that in the state of stroboscopic photographing. This is only difference between the first embodiment and the third embodiment, and other parts are the same and common between them. Explanation of the common parts will be omitted here.

In the lens-fitted film unit in the present embodiment, a shutter speed in the state of stroboscopic photographing is different from that in the state of normal photographing, and the shutter speed in the state of stroboscopic photographing is lower than that in the state of normal photographing.

Owing to the structure stated above, it is possible to obtain a lens-fitted film unit wherein it is possible to photograph favorably at the bright place such as the outdoors in the daytime in the state of ordinary photographing, and to photograph at dark outdoors or in the room with well-balanced luminance for both a background and a main object.

Incidentally, as a method to change a shutter speed when switching between the state of normal photographing and the state of stroboscopic photographing, it is preferable to use a method employing a shutter speed switching mechanism which switches a shutter speed interlocking with an electronic flash switching lever representing an operation means which switches between the use and non-use of an electronic flash unit.

Figure 5:
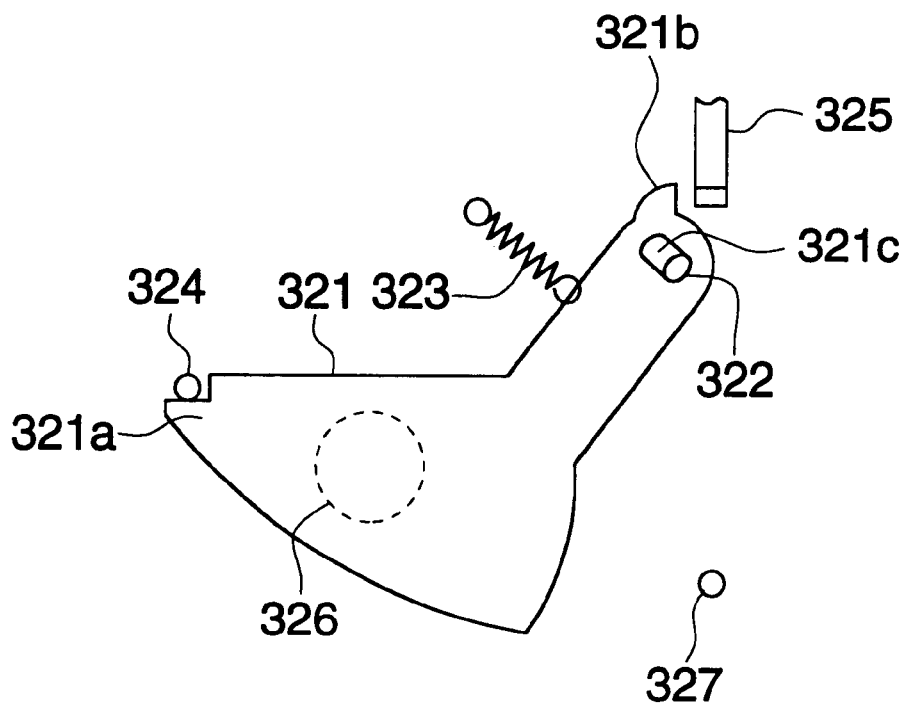
FIG. 5 is a front view of a sector and its surrounding wherein shutter charging has been completed.
Figure 6:
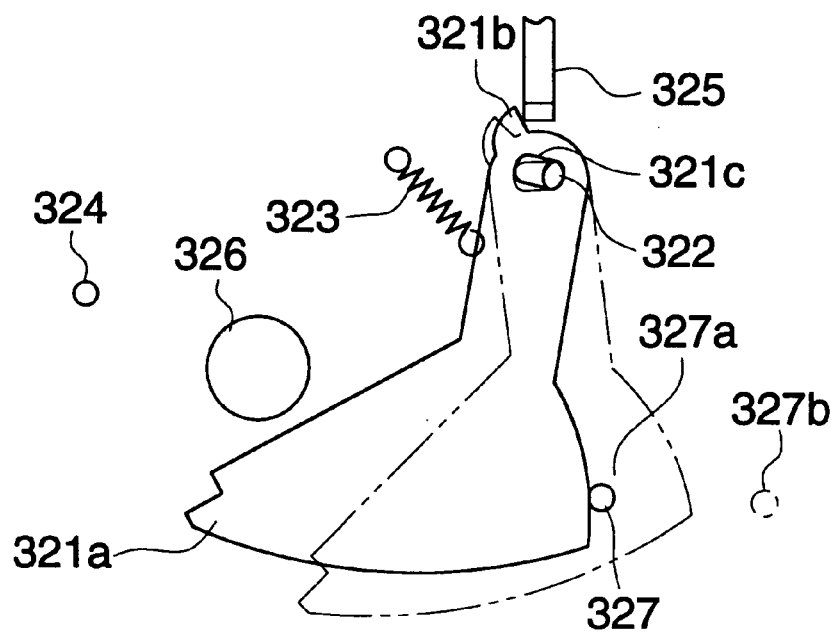
FIG. 6 is a front view of a sector and its surrounding wherein the sector has opened an aperture section.

An example of a concrete embodiment of a shutter speed switching mechanism is shown in FIGS. 5 and 6. FIG. 5 is a front view showing the state of completion of shutter charging, and FIG. 6 is a front view wherein an open aperture section is opened by a sector.

In FIG. 5, sector 21 is swiveled on the center of supporting shaft 322, and is urged clockwise by tension spring 323. Therefore, when is at a standstill, end portion 321a of the sector 321 is in contact with stopper 324, and the sector 321 closes open aperture section 326 which allows light from an object to a film to pass through. Incidentally, the sector 321 is arrange behind an aperture.

In the case of shutter charging, charge lever 325 moves from left to right in FIG. 5, interlocking with film-winding, and passes across end portion 321b of the sector 321. In this case, the end portion 321b is pushed down by the charge lever 325 because hole 321c of the sector 321 which engages with supporting shaft 322 is formed to be an elongated hole, and the sector 321 moves downward slightly, but open aperture portion 326 is not opened at all.

After shutter charging is completed as shown in FIG. 5, when a release button shown in FIG. 1 is pressed by a user, the charge lever 325 is moved quickly by an unillustrated spring to the left, and it hits the right side of the end portion 321b of the sector 321. Thereby, the sector 321 is swiveled counterclockwise and opens the open aperture portion 326 as shown in FIG. 6. After the sector 321 is swiveled by the prescribed angle by the force of inertia, against the urging force of tension spring 323, it hits stopper 327 and stops. Then, it is swiveled clockwise by the urging force of tension spring 323 to close the open aperture portion 326.

Stopper 327 is one which interlocks with electronic flash switching lever 4 to move, and when the electronic flash switching lever 4 slides to the left to turn off the main switch of the electronic flash unit, the stopper 327 is located at position 327a shown with solid lines in FIG. 6 to be in contact with sector 321, and the shutter speed is high. However, when the electronic flash switching lever slides to the right to turn on the main switch of the electronic flash unit, the stopper 327 moves to position 327b shown with two-dot chain lines in FIG. 6 not to be in contact with sector 321, thus, the shutter speed is low. Namely, in the case of normal photographing wherein no stroboscopic photographing is conducted, the shutter speed is high, while, in the case of stroboscopic photographing, the shutter speed is low.

The lens-fitted film unit in the third embodiment is also the one wherein a guide number of an electronic flash unit, a T-number determined by a camera lens and an diaphragm, and a shutter speed of a shutter unit are determined so that A is not more than 8.5 when A represents EV value of reference exposure amount of lens-fitted film unit—1.5 in the state of stroboscopic photographing, and intensity of a latent image formed on a photographic film when a reference reflection panel positioned at the prescribed distance of 2–3 m from the lens-fitted film unit is illuminated by an electronic flash unit and photographed in the state of stroboscopic photographing under the condition of no external light may be the same as intensity of a latent image obtained under the condition of photographing luminance of not more than A+5.0 in terms of EV value. More preferable conditions will be omitted here because they are the same as those in the first embodiment.

In the present embodiment, a shutter speed in the state of stroboscopic photographing is different from that in the state of normal photographing. Therefore, preferable conditions of EV value A' of reference exposure amount in the state of stroboscopic photographing are different from those of EV value B of reference exposure amount in the state of ordinary photographing. Preferable conditions for each of them are omitted here because they are the same as those in the second embodiment.

Further, preferable conditions for a guide number and a capacitor of an electronic flash unit are omitted here because they are the same as those in the first embodiment.

A T-number in the present embodiment is invariable, and it is preferable that it is in a range from 4 to 10. A range from 7 to 10 is more preferable, and a range from 7 to 8.9 is more preferable than the former.

Preferable focal length and material of a camera lens will be omitted here because they are the same as those in the first embodiment.

In the present embodiment, a shutter speed in the state of stroboscopic photographing is different from that in the state of normal photographing, and the shutter speed in the state of stroboscopic photographing is slower.

In the present embodiment, it is preferable that a shutter speed of the shutter unit in the state of stroboscopic photographing is in a range from $1/100$ to $1/30$, and a range from $1/100$ to $1/30$ is more preferable, a range from $1/60$ to $1/50$ is still more preferable, and a range from $1/80$ to $1/50$ is furthermore preferable. (The greater the value is, the slower the speed is.)

It is preferable that the shutter speed in the state of normal photographing is lower than $1/60$, a range from $1/130$ to $1/60$ is more preferable and a range from $1/130$ to $1/70$ is still more preferable.

Incidentally, in the present embodiment, the shutter speed is changed when switching between the state of stroboscopic photographing and state of normal photographing, but in the state of stroboscopic photographing, it is preferable that neither shutter speed nor T-number is changed. Even in the state of ordinary photographing, it is also preferable that the shutter speed and the T-number are invariable.

Even in the case of the present embodiment, it is preferable to satisfy expression (9) and (10). Conditions which are more preferable are omitted here because they are the same as those in the first embodiment.

In the present embodiment, when an APS film is used, it is preferable that the film speed is in a range from ISO 400 to ISO 640. It is preferable to make the shutter speed in the state of stroboscopic photographing to be within a range from $1/50$ to $1/40$ and to make the shutter speed in the state of normal photographing to be within a range from $1/120$ to $1/100$. Further, in that case, it is preferable that the guide number of the electronic flash unit at ISO 100 is in a range from 11 to 12, and the T-number preferably is in a range from 8 to 10. In this case, however, there is possibility that a luminance difference between a background and the standard reflection plate is EV 5.0 or more.

In the lens-fitted film unit of the present embodiment too, the lowest photographing luminance with which a latent image capable of forming an image on an image carrier on which a visible image is formed finally can be formed on a photographic film through photographing conducted with T-number and shutter speed for the state of stroboscopic photographing and without electronic flash light of an electronic flash unit, is not more than 8.5, and a guide number of the electronic flash unit, T-number determined by a camera lens and an diaphragm and s shutter speed of a shutter unit are determined so that a luminance difference on the photographic film between a reference reflection panel and a background may be within a range of latitude of the photographic film which makes it possible to form an image finally within a range of latitude of an image carrier, when a reference reflection panel positioned at the prescribed distance of 2–3 m from the lens-fitted film unit is illuminated by electronic flash light of the electronic flash unit and photographed together with a background having the lowest photographing luminance in the state of stroboscopic photographing.

Explanation of the image carrier on which a visible image is formed finally will be omitted here, because it is the same as that in the first embodiment.

(Fourth Embodiment)

The fourth embodiment of the lens-fitted film unit with a built-in electronic flash unit will be explained as follows.

Incidentally, in the first embodiment, a shutter speed and a T-number in the state of normal photographing are the same as those in the stroboscopic photographing. In the lens-fitted film unit of the present embodiment, however, a T-number determined by a camera lens and an diaphragm as well as a shutter speed of the shutter unit in the state of normal photographing are different from those in the state of stroboscopic photographing. This is only difference between the first embodiment and the present embodiment, and other parts are the same and common between them. Explanation of the common parts will be omitted here.

In the lens-fitted film unit in the present embodiment, a shutter speed of the shutter unit in the state of stroboscopic photographing is different from that in the state of normal photographing, and the shutter speed in the state of stroboscopic photographing is slower than that in the state of normal photographing. Further, in the lens-fitted film unit in the present embodiment, a T-number determined by a camera lens and an diaphragm in the state of stroboscopic photographing is different from that in the state of normal photographing, and the T-number in the state of stroboscopic photographing is smaller than that in the normal photographing.

Owing to the structure stated above, it is possible to obtain a lens-fitted film unit wherein it is possible to photograph favorably at the bright place such as the outdoors in the daytime in the state of ordinary photographing, and to photograph at dark outdoors or in the room with well-balanced luminance for both a background and a main object.

Incidentally, as a method to change a T-number when switching between the state of normal photographing and the state of stroboscopic photographing, it is preferable to use a method employing the aperture switching mechanism described in the second embodiment. As a method to change a shutter speed when switching between the state of normal photographing and the state of stroboscopic photographing, it is preferable to use a method employing the shutter speed switching mechanism described in the third embodiment.

The lens-fitted film unit in the fourth embodiment is also the one wherein a guide number of an electronic flash unit, a T-number determined by a camera lens and an diaphragm, and a shutter speed of a shutter unit are determined so that A is not more than 8.5 when A represents EV value of reference exposure amount—1.5 in the state of stroboscopic photographing, and intensity of a latent image formed on a photographic film when a reference reflection panel positioned at the prescribed distance of 2–3 m from the lens-fitted film unit is illuminated by an electronic flash unit and photographed in the state of stroboscopic photographing under the condition of no external light may correspond to intensity of a latent image obtained under the condition of photographing luminance of not more than A+5.0 in terms of EV value. More preferable conditions will be omitted here because they are the same as those in the first embodiment.

In the present embodiment, preferable conditions of EV value A' of reference exposure amount in the state of stroboscopic photographing are different from those of EV value B of reference exposure amount in the state of normal photographing. Preferable conditions for each of them are omitted here because they are the same as those in the second embodiment.

Further, preferable conditions for a guide number and a capacitor of an electronic flash unit are omitted here because they are the same as those in the first embodiment.

Preferable conditions for the T-number in the present embodiment are omitted here because they are the same as those in the second embodiment.

Preferable focal length and material of a camera lens will be omitted here because they are the same as those in the first embodiment.

Preferable conditions for the shutter speed in the present embodiment are omitted here because they are the same as those in the third embodiment.

Incidentally, in the present embodiment, a T-number and a shutter speed are changed when switching between the state of stroboscopic photographing and state of normal photographing, however, in the state of stroboscopic photographing, it is preferable that neither shutter speed nor T-number is changed. Even in the state of normal photographing, it is also preferable that the shutter speed and the T-number are invariable.

Even in the case of the present embodiment, it is preferable to satisfy expression (9) and (10). Conditions which are more preferable are omitted here because they are the same as those in the first embodiment.

In the present embodiment, preferable conditions when an APS film is used are the same as those in the third embodiment.

In the lens-fitted film unit of the present embodiment too, the lowest photographing luminance with which a latent image capable of forming an image on an image carrier on which a visible image is formed finally can be formed on a photographic film through photographing conducted with T-number and shutter speed for the state of stroboscopic photographing and without electronic flash light of an electronic flash unit, is not more than 8.5, and a guide number of the electronic flash unit, T-number determined by a camera lens and an diaphragm and s shutter speed of a shutter unit are determined so that a luminance difference on the photographic film between a reference reflection panel and a background may be within a range of latitude of the photographic film which makes it possible to form an image finally within a range of latitude of an image carrier, when a reference reflection panel positioned at the prescribed distance of 2–3 m from the lens-fitted film unit is illuminated by electronic flash light of the electronic flash unit and photographed together with a background having the lowest photographing luminance in the state of stroboscopic photographing.

Explanation of the image carrier on which a visible image is formed finally will be omitted here, because it is the same as that in the first embodiment.

A preferable example in the fourth embodiment will be shown below, by the use of numerical values. In the present embodiment, a T-number and a shutter speed in the state of stroboscopic photographing are different from those in the state of normal photographing. For example, there is given, as a preferable example, a lens-fitted film unit wherein a built-in photographic film is a 135 film with a speed of ISO 800, a shutter speed in the state of stroboscopic photographing is 1/80, a shutter speed in the state of normal photographing is 1/125, a T-number in the state of stroboscopic photographing is 7.3, a T-number in the state of normal photographing is 13.4, and a guide number of an electronic flash unit is 7. The mechanism shown in FIG. 3 is used as an aperture switching mechanism. The mechanism shown in FIGS. 5 and 6 is used as a shutter speed switching mechanism. The camera lens is a two-element plastic lens whose focal length is 30 mm.

The guide number which is 7 at ISO 100 turns out to be 19.8 after being converted into one at ISO 800. Therefore, an object distance which causes appropriate exposure is 19.8/7.3=2.7 m. Namely, when the standard reflection plate is placed to be away from the lens-fitted film unit by 2.7 m, this standard reflection plate is exposed under the state of appropriate exposure. Under-exposure up to EV 1.5 is within am allowable range and the maximum object distance under electronic flash is 4.6 m. It is therefore possible to obtain a sufficient object distance in spite of using a small-sized electronic flash unit having a guide number smaller than the conventional one, namely, an electronic flash unit with a smaller quantity of light.

On the other hand, exposure for the background where no electronic flash light comes during stroboscopic photographing is determined only by a T-number and a shutter speed. Therefore, EV value in the case of using a film with ISO 100 is EV 12.1. However, the actually loaded film is that with ISO 800. Therefore, EV value A' of the standard exposure in the state of stroboscopic photographing is substantially 9.1.

Therefore, the background which is farther than the maximum object distance in stroboscopic photographing is exposed with the exposure of EV 9.1, and an allowable range of EV value on the under-exposure side obtained from a latitude of a photographic film is about 1.5. Therefore, up to EV 7.6 which is darker than the conventional one, the background does not appear to be black to lose details on a photograph.

In a lens-fitted film unit the shortest object distance in ordinary photographing is established to be about 1 m, and exposure by electronic flash light on the object of standard reflection plate placed to be away from the lens-fitted film unit by 1 m is equivalent to EV 12 when stroboscopic photographing is conducted. Thus, the luminance difference between the object and the background is within latitude EV 4.5 which is owned by an ordinary photographic paper, and both the background of EV 7.6 and the object at 1 m can be reproduced satisfactorily on a photographic print.

When photographing only dim scenes in the morning and evening, emission of electronic flash light has nothing to do with the photographing. However, when an aperture is opened fully in the state of stroboscopic photographing, photographing is carried out with EV 9.1, and it is possible to obtain photographs which are sufficiently exposed properly.

Further, in the state of photographing by external light in the daytime with no electronic flash light, namely in the state of ordinary photographing, an EV value in the case of using an ISO 100 film is 14.5. However, the speed of the actual film is ISO 800, and standard exposure B in the state of ordinary photographing is 11.5, thus, photographing in the outdoors in the daytime can be conducted satisfactorily.

Accordingly, compared with a conventional lens-fitted film unit, it is possible to photograph even in the darker place, and a background and a main object can be photographed with good balance. In addition, it is possible to obtain a sufficient object distance in spite of using a small-sized electronic flash unit having a guide number smaller than the conventional one, namely, an electronic flash unit with a smaller quantity of light. It is further possible to photograph under high luminance such as in the outdoors in the daytime.

Examples of a camera lens will be explained as follows. Symbols in each example are as follow. Further, the following example is based on the last lens-fitted film unit in the above-mentioned second embodiment and various lenses are used.

$F_o$: Open aperture F-number of a camera lens representing an F-number in the use of an electronic flash unit
$F_{off}$: F-number in the state of ordinary photographing
f: Focal distance of a camera lens
__: Half angle of field
r: Radius of curvature of refracting interfaces
d: Distance of refracting interfaces
$N_d$: Index of refraction at d line
$v_d$: Abbe number
$y_L$: Half of longitudinal length of photographed image plane
U: Distance between an object and an image A form of an aspheric surface used in the invention is expressed by expression 1, when the axis of abscissas (x-axis) is taken in the direction of an optical axis in coordinates and h represents a height in the direction perpendicular to the optical axis.

$$X = \frac{h^2/r}{1+\sqrt{1-(K+1)h^2/r^2}} + \sum_{i=2}^{6} A_{2i}h^{2i} \quad (21)$$

In expression 16, K represents a circular cone constant of an aspheric surface, and $A_{2i}$ represents an aspheric surface coefficient (i=2, 3, 4, 5 and 6).

In the drawings, ΔS represents sagittal, and ΔM represents meridional.

EXAMPLE 1

Figure 9:
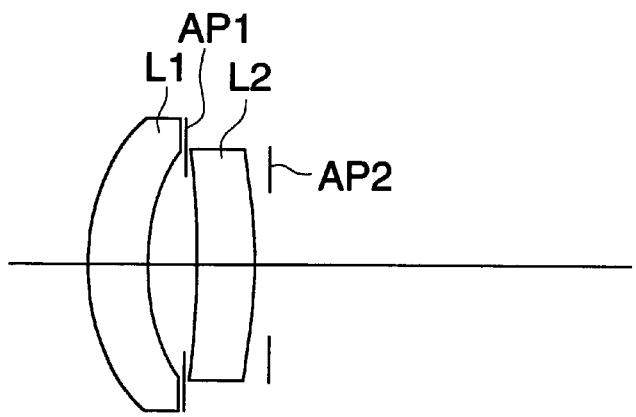
FIG. 9 is a sectional view of an optical axis of a lens in the first lens example.

FIG. 9 shows a sectional view of an optical axis of a lens and FIGS. 10A, 10B, and 10C show diagrams of lens aberration. Lens data shown in Table 1.

TABLE 1

| f = 30.0 | ω = 36.7° | $F_o$ = 6.7 | $F_{off}$ = 10–16 | |
|---|---|---|---|---|
| Surface No. | r | d | $N_d$ | $v_d$ |
| 1* | 5.170 | 1.61 | 1.49200 | 57.0 |
| 2 | 5.611 | 1.10 | | |
| 3 (Aperture 1) | ∞ | 0.09 | | |
| 4 | −56.729 | 1.61 | 1.49200 | 57.0 |
| 5 | −17.450 | 0.40 | | |
| 6 (Aperture 2) | ∞ | | | |

| Surface | Aspheric surface coefficient |
|---|---|
| First surface | K = −9.57870 × 10⁻² <br> $A_4$ = 8.37660 × 10⁻⁶ <br> $A_6$ = −2.77510 × 10⁻⁵ <br> $A_8$ = 1.55120 × 10⁻⁶ <br> $A_{10}$ = −8.84980 × 10⁻⁸ |

However, the following represent conditions in the Table 1 above.

Figure 7:
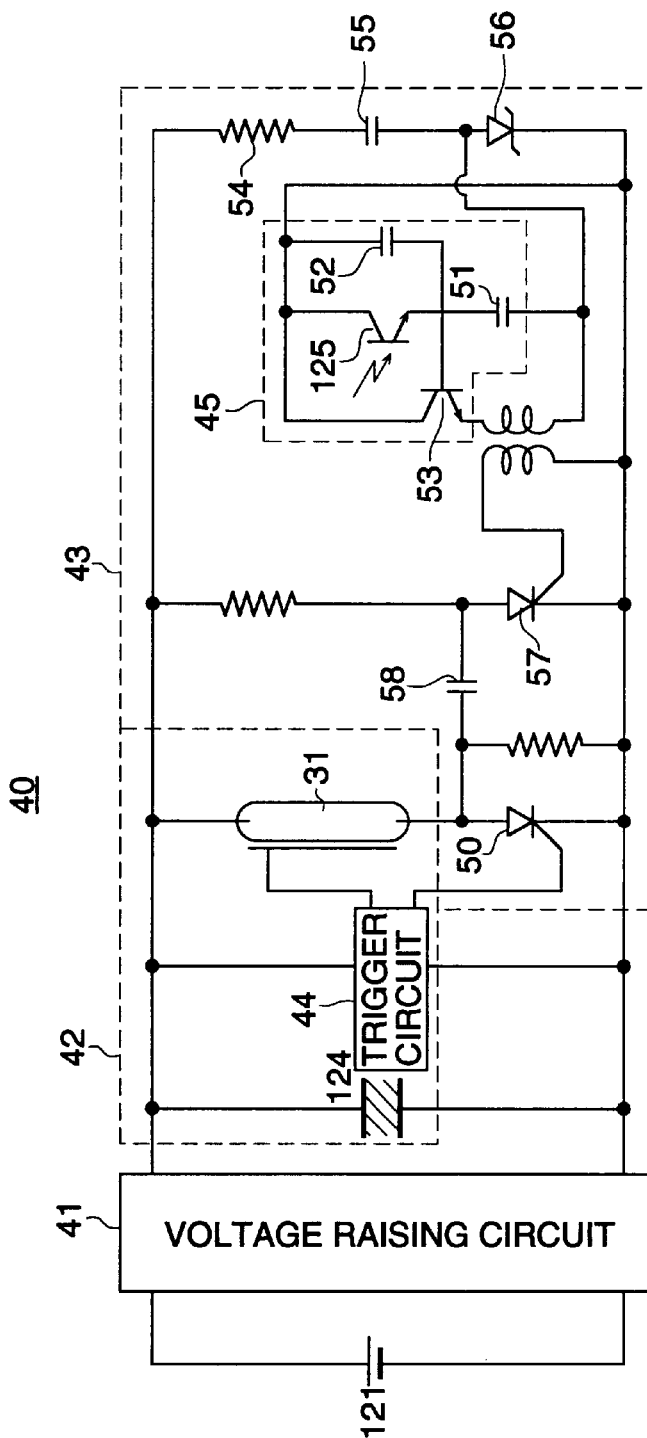
FIG. 7 is a circuit diagram of the first example of an automatic light-adjusting electronic flash unit.
Figure 10:
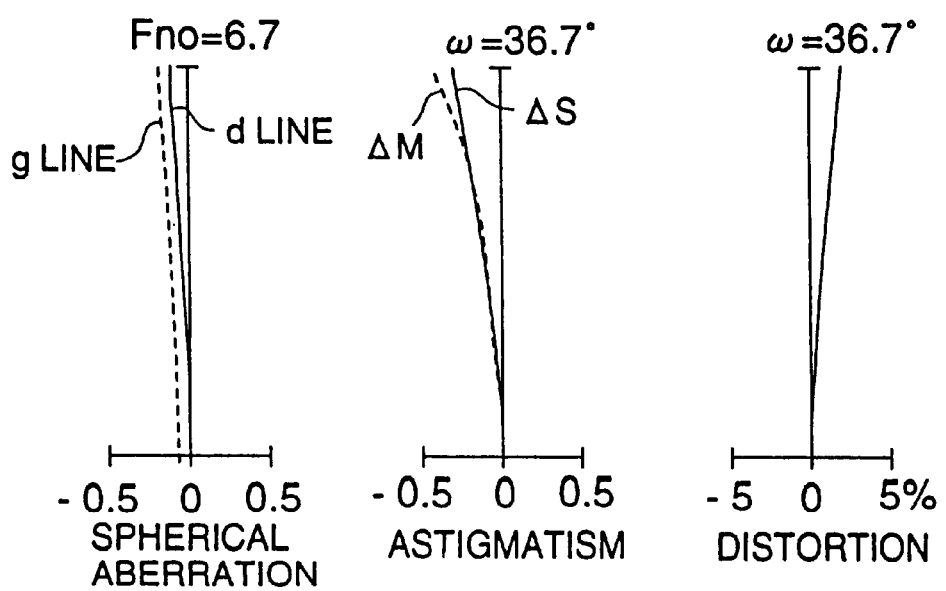
FIGS. 10A, 10B, and 10C are diagrams of lens aberrations in the first lens example.
Figure 11:
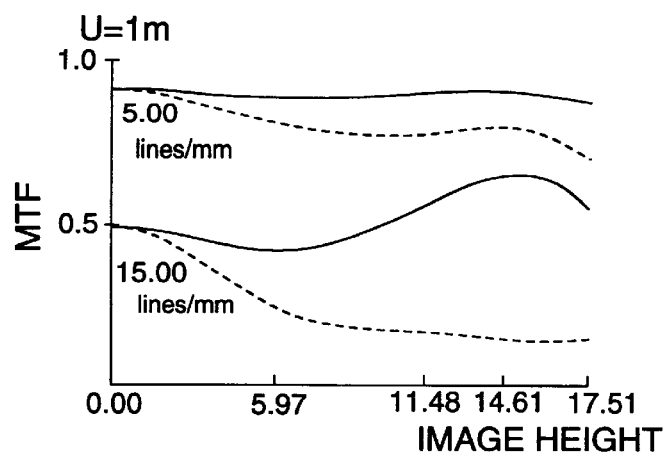
–FIG. 11C is a diagram of MTF at $F_0$ in the first lens example.
Figure 11:
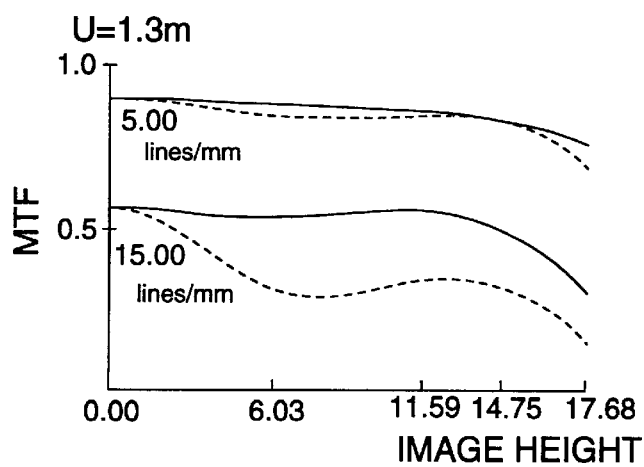
Figure 11:
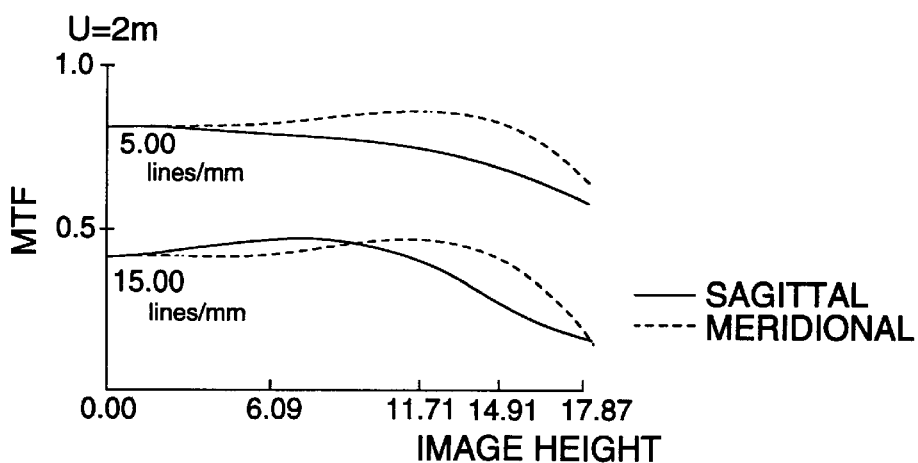
Figure 12:
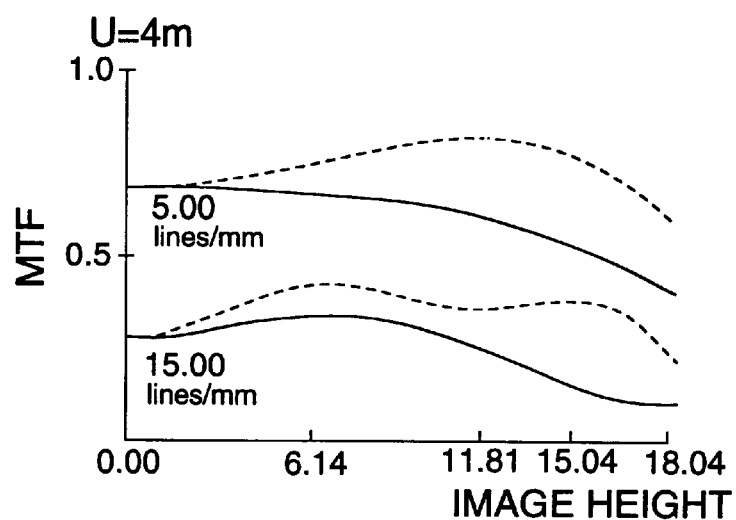
–FIG. 12E is a diagram of MTF at $F_0$ in the first lens example.
Figure 12:
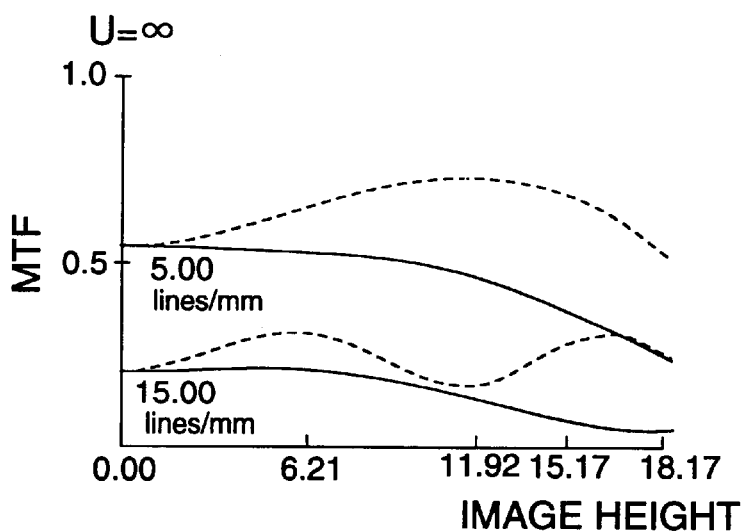
Figure 13:
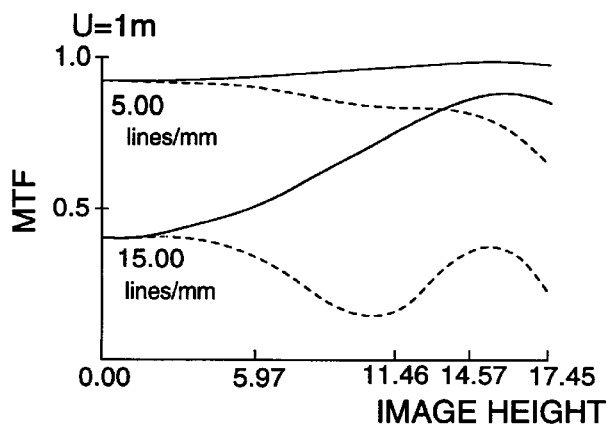
–FIG. 13C is a diagram of MTF at $F_{off}$ in the first lens example.
Figure 13:
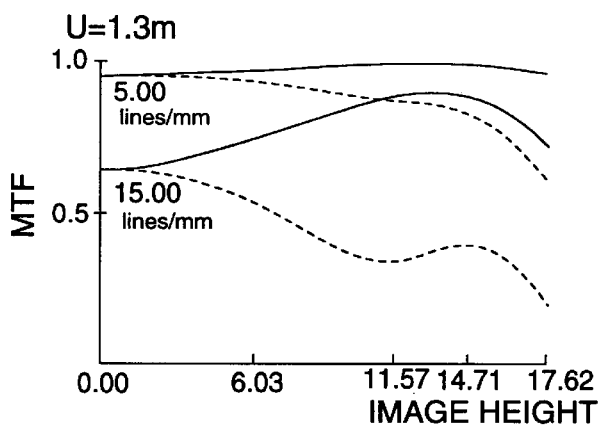
Figure 13:
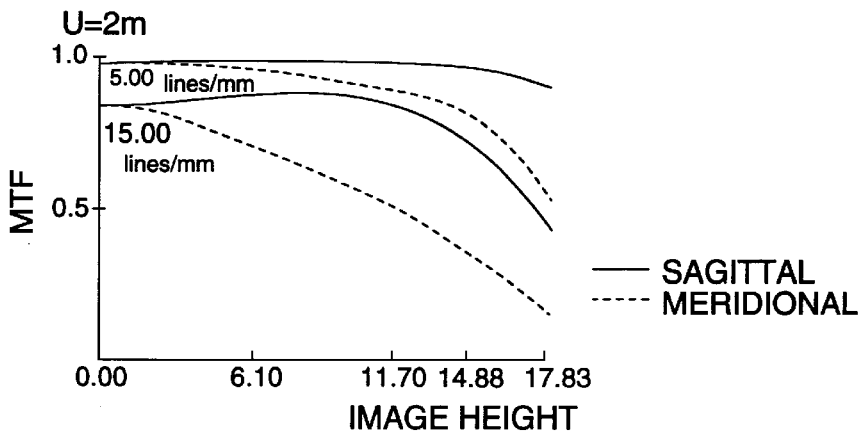
Figure 14:
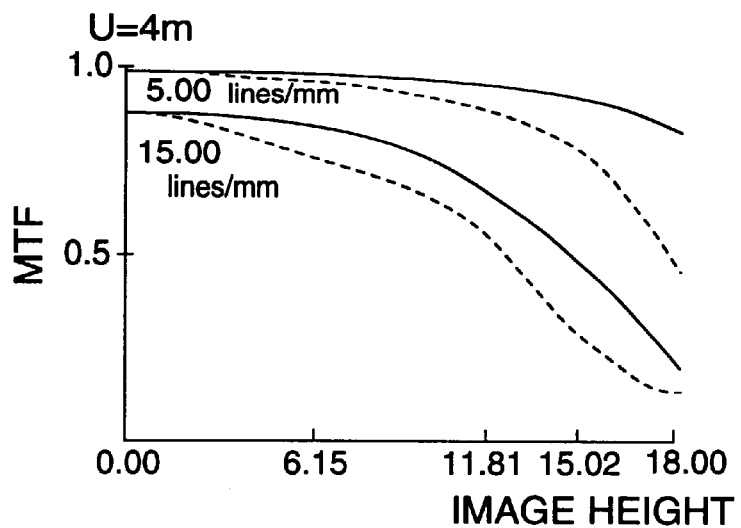
–FIG. 14E is a diagram of MTF at $F_{off}$ in the first lens example.
Figure 14:
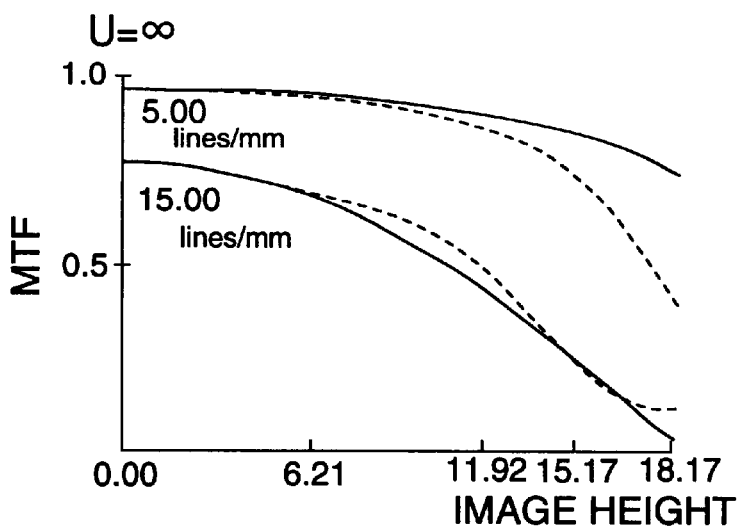

$f/(F_o \cdot \tan \omega) = 6.0$ $SA(F_o/0.7)/y_L = -0.044$ $F_o/F_{off} = 0.42-0.67$ $SA(F_o)/(F_{off} \cdot y_L) = -0.0042 - 0.0067$ Each of FIGS. 7 and 8 shows a diagram of MTF of the white light at each object distance in the longitudinal direction of an image plane wherein $F_{off}$ is 13, a distance ween the final surface of a camera lens and a photographed image plane is 25.8 mm, an image pick-up plane is made to be a cylindrical surface whose radius of curvature is 110 mm, and an aperture is made to be $F_o$. In the same way, each of FIGS. 9 and 10 shows a diagram of MTF of the white light at each object distance in the longitudinal direction of an image plane wherein an aperture is stopped down to $F_{off}$.

As shown in diagrams of MTF in FIGS. 11–14, an object positioned in the range from 1 m to 4 m which is a distance covered by an electronic flash unit is in true focus, at an open aperture, and when no flash light is used, an aperture is F13 and an object positioned in a range from 1 m to infinity is in true focus. Further, the MTF value itself is sufficient and a photograph with excellent image quality can be obtained.

EXAMPLE 2

Figure 15:
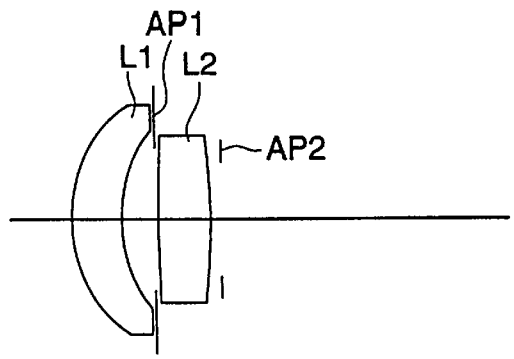
FIG. 15 is a sectional view of an optical axis of a lens in the second lens example.
Figures 16A, 16B, 16C:
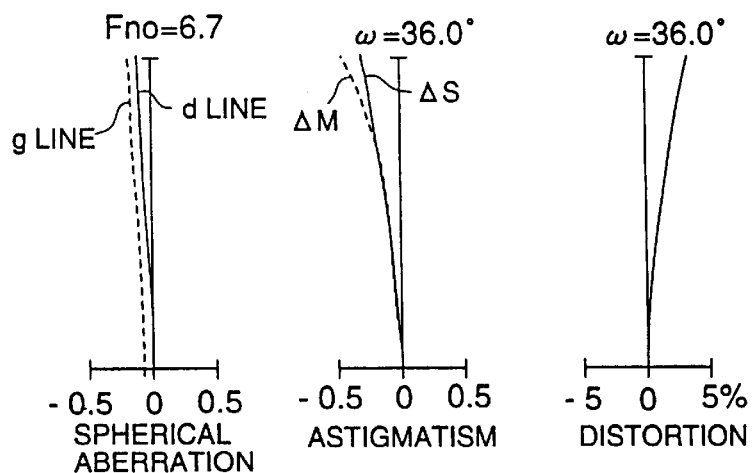
FIGS. 16A, 16B, and 16C are diagrams of lens aberrations in the second lens example.

FIG. 15 shows a sectional view of an optical axis of a lens, and FIGS. 16A, 16B, and 16C show lens aberration diagrams. Lens data are shown in Table 2.

TABLE 2

| f = 30.0 | ω = 36° | $F_o$ = 6.7 | $F_{off}$ = 10–16 | |
|---|---|---|---|---|
| Surface No. | r | d | $N_d$ | $v_d$ |
| 1 | 4.559 | 1.61 | 1.49200 | 57.0 |
| 2* | 4.850 | 1.10 | | |
| 3 (Aperture 1) | ∞ | 0.09 | | |
| 4 | 104.279 | 1.61 | 1.49200 | 57.0 |
| 5 | −37.557 | 0.40 | | |
| 6 (Aperture 2) | ∞ | | | |

| Surface | Aspheric surface coefficient |
|---|---|
| First surface | K = 2.41210 × $10^{-2}$<br>$A_4$ = −2.69470 × $10^{-5}$<br>$A_6$ = 9.55270 × $10^{-5}$<br>$A_8$ = −8.41510 × $10^{-6}$<br>$A_{10}$ = 4.93290 × $10^{-7}$ |

However, the following represent conditions in the Table 2 above.

$$f/(F_o \cdot \tan \omega) = 6.16$$

$$SA(F_o/0.7)/y_L = -0.044$$

$$F_o/F_{off} = 0.42 - 0.67$$

$$SA(F_o)/(F_{off} y_L) = -0.0040 - -0.0064$$

EXAMPLE 3

Figure 17:
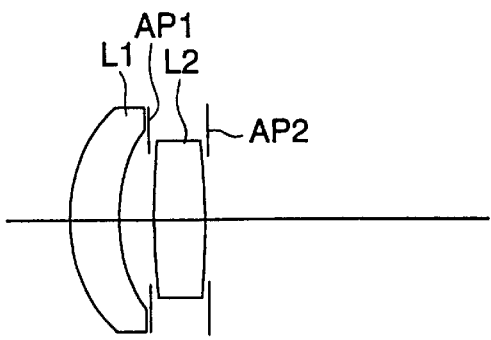
FIG. 17 is a sectional view of an optical axis of a lens in the third lens example.
Figures 18A, 18B, 18C:
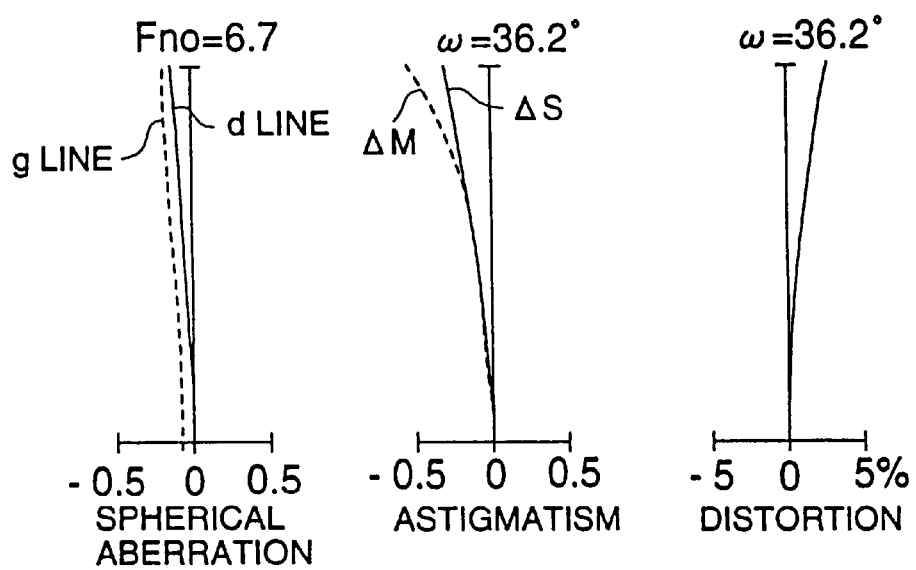
FIGS. 18A, 18B, and 18C are diagrams of lens aberrations in the third lens example.

FIG. 17 shows a sectional view of an optical axis of a lens, and FIGS. 18A, 18B, and 18C show lens aberration diagrams. Lens data are shown in Table 3.

TABLE 3

| f = 30.0 | ω = 36.2° | $F_o$ = 6.7 | $F_{off}$ = 10–16 | |
|---|---|---|---|---|
| Surface No. | r | d | $N_d$ | $v_d$ |
| 1* | 4.608 | 1.61 | 1.49200 | 57.0 |
| 2 | 4.705 | 1.10 | | |
| 3 (Aperture 1) | ∞ | 0.09 | | |
| 4 | 50.000 | 1.61 | 1.49200 | 57.0 |
| 5 | −39.392 | 0.40 | | |
| 6 (Aperture 2) | ∞ | | | |

| Surface | Aspheric surface coefficient |
|---|---|
| First surface | K = −6.59530 × $10^{-2}$<br>$A_4$ = −2.24290 × $10^{-5}$<br>$A_6$ = −4.15970 × $10^{-5}$<br>$A_8$ = 2.70010 × $10^{-6}$<br>$A_{10}$ = 1.45560 × $10^{-7}$ |

However, the following represent conditions in the Table 2 above.

$$f/(F_o \cdot \tan \omega) = 6.12$$

$$SA(F_o/0.7)/y_L = -0.044$$

$$F_o/F_{off} = 0.42 - 0.67$$

$$SA(F_o)/(F_{off} y_L) = -0.0040 - -0.0064$$

Disclosed embodiment can be varied by a skilled person without departing from the spirit and scope of the invention.

What is claimed is:

1. A lens-fitted film unit, comprising:
   a main body;
   a photographic film, pre-loaded in said main body;
   an electronic flash unit;
   a shutter unit;
   a camera lens; and
   a diaphragm;
   wherein a guide number of said electronic flash unit, a T-number determined from said camera lens and said diaphragm and a shutter speed of said shutter unit are determined so that A is not more than 8.5 when A represents an EV value of a reference exposure amount of said lens-fitted film unit under a first photographing state minus 1.5; and intensity of a latent image, formed on said photographic film under the condition that a reference reflection panel being placed at a predetermined distance between 2–3 m from said lens-fitted film unit is illuminated by said electronic flash unit without other lights in said first photographing state, corresponds to intensity of a latent image obtained under a photographing condition of photographing luminance not more than A+5.0 in EV value.

2. The lens-fitted film unit of claim 1, wherein said guide number of said electronic flash unit, said T-number determined from said camera lens and said diaphragm and said shutter speed of said shutter unit are determined so that a intensity of a latent image, formed on said photographic film under the condition that a reference reflection panel being placed at a predetermined distance between 2–3 m from said lens-fitted film unit is illuminated by said electronic flash unit without other lights in said first photographing state, corresponds to intensity of a latent image obtained under a photographing condition of photographing luminance not more than A+4.5 in EV value.

3. The lens-fitted film unit of claim 1, wherein a shutter speed in said first photographing state is slower than a shutter speed in a second photographing state that photographing is executed without using said electronic flash unit.

4. The lens-fitted film unit of claim 1, wherein a T-number in said first photographing state is smaller than a T-number in a second photographing state that photographing is executed without using said electronic flash unit.

5. The lens-fitted film unit of claim 4, wherein said diaphragm includes a panel member having two holes in different sizes, said panel member is movably placed between said camera lens and an exposure surface of said photographic film, and T-number of said lens-fitted film unit is varied by moving said panel member.

6. The lens-fitted film unit of claim 1, wherein EV value A' of said reference exposure amount under said first photographing state, converted to an EV value under the condition that photographing is executed with an ISO 100 photographic film in said first photographing state, satisfies the formula:

$$A' <= 10.$$

7. The lens-fitted film unit of claim 6, wherein EV value A' of said reference exposure amount, converted to an EV value under the condition that photographing is executed with an ISO 100 photographic film in said first photographing state, satisfies the formula:

$$6 <= A' <= 9.5.$$

8. The lens-fitted film unit of claim 6, wherein at least one of said shutter speed and said T-number in said first photographing state is different from those in a second photographing state and EV value B of said reference exposure amount, converted to an EV value under the condition that photographing is executed with an ISO 100 photographic film in said second photographing state, satisfies the formula:

$$A'+1 <= B <= A'+4.$$

9. The lens-fitted film unit of claim 8, wherein EV value B of said reference exposure amount, converted to an EV value under the condition that photographing is executed with an ISO 100 photographic film in said second photographing state, satisfies the formula:

$$9 <= B <= 13.$$

10. The lens-fitted film unit of claim 1, wherein said electronic flash unit includes a main capacitor whose capacity is between 15 $\mu F$ and 80 $\mu F$.

11. The lens-fitted film unit of claim 1, wherein a guide number of said electronic flash unit at ISO 100 is not more than 9.

12. The lens-fitted film unit of claim 1, wherein said electronic flash unit has a constant light amount.

13. The lens-fitted film unit of claim 1, wherein said electronic flash unit has an electronic flash circuit, comprising:
   a boosting circuit;
   an electronic flash light emitting circuit, having;
      a trigger circuit;
      a main capacitor; and
      an electronic flash light emitting tube;
   a light-receiving element for receiving light, reflected from an object when said electronic flash light emitting tube emits light, so as to generate light-receiving signals; and
   an electronic flash light emission stopping circuit for stopping light emission of said electronic flash light emitting tube according to said light-receiving signals of said light receiving element.

14. The lens-fitted film unit of claim 1, wherein said electronic flash unit uses a battery of AA size or AAA size.

15. The lens-fitted film unit of claim 1, wherein said T-number of said lens-fitted film unit in said first photographing state satisfies the formula:

$$4 <= F <= 8.9$$

when F is said T-number.

16. The lens-fitted film unit of claim 15, wherein said T-number of said lens-fitted film unit in said first photographing state is different from that in a second photographing state and said T-number in said second photographing state satisfies the formula:

$$9 <= F' <= 14$$

when F' is said T-number.

17. The lens-fitted film unit of claim 1, wherein a focal length of said camera lens is between 28 mm and 35 mm.

18. The lens-fitted film unit of claim 1, wherein said camera lens has single focal length.

19. The lens-fitted film unit of claim 1, wherein said shutter speed and said T-number are fixed in said first photographing state.

20. The lens-fitted film unit of claim 1, wherein said shutter speed in said first photographing state satisfies the formula:

$$1/30 >= T >= 1/100$$

when T is said shutter speed.

21. The lens-fitted film unit of claim 1, wherein said shutter speed in said first photographing state is different from that in a second photographing state and said shutter speed in said second photographing state satisfies the formula:

$$1/60 >= T' >= 1/130$$

when T' is said shutter speed.

22. The lens-fitted film unit of claim 1, wherein said shutter speed in said first photographing state and said guide number of said electronic flash unit at ISO 100 satisfy the formula:

$$G^2/T < 8000$$

when G is said guide number and T is said shutter speed.

23. The lens-fitted film unit of claim 1, wherein said T-number in said first photographing state is smaller than said T-number in a second photographing state and MTF values of said camera lens at a vicinity of the axis satisfies the formulas:

$$0.1 < M\ 24$$

$$0.1 < M\ 22$$

when M 24 is a MTF value of said camera lens when a distance between said lens-fitted film unit and an object to be photographed is 4 m, said T-number is of said first photographing state and a spatial frequency is 15 lines/mm; and M 22 is a MTF value of said camera lens when a distance between said lens-fitted film unit and an object to be photographed is 2 m, said T-number is of said first photographing state and a spatial frequency is 15 lines/mm.

24. The lens-fitted film unit of claim 1, wherein said guide number of said electronic flash unit, said T-number determined from said camera lens and said diaphragm and said shutter speed of said shutter are determined so that intensity of a latent image, formed on said photographic film under the condition that a reference reflection panel being placed at a predetermined distance between 2–3 m from said lens-fitted film unit is illuminated by said electronic flash unit without other lights in said first photographing state, corresponds to intensity of a latent image obtained under a photographing condition of a proper photographing luminance.

25. The lens-fitted film unit of claim 1, wherein said guide number of said electronic flash unit, said T-number determined from said camera lens and said diaphragm and said shutter speed of said shutter are determined so that intensity of a latent image, formed on said photographic film under the condition that a reference reflection panel being placed at a predetermined distance of 1 m from said lens-fitted film unit is illuminated by said electronic flash unit without other lights in said first photographing state, corresponds to intensity of a latent image obtained under a photographing condition of a photographing luminance not more than A+5.0 in EV value.

26. The lens-fitted film unit of claim 1, wherein said shutter speed in said first photographing state is slower than said shutter speed in a second photographing state and said guide number of said electronic flash unit at ISO 100 is between 11 and 12.

27. An image forming method, comprising the steps of:

photographing a picture with a lens-fitted film unit;

exposing a photographic film, pre-loaded in said lens-fitted film unit;

taking out said photographic film, pre-loaded in said lens-fitted film unit having an electronic flash unit and exposed by a photographing operation, from said lens-fitted film unit;

developing said photographic film; and forming a visible image on an image carrier according to image information formed on said photographic film by said developing step;

wherein said lens-fitted film unit comprises a main body, said photographic film, pre-loaded in said main body, said electronic flash unit, a shutter unit, a camera lens, and a diaphragm;

a guide number of said electronic flash unit, a T-number determined from said camera lens and said diaphragm and a shutter speed of said shutter unit are selected so that a minimum photographing luminance, which enables latent image forming on said photographic film by which an image is able to be formed on said image carrier when a photographing operation is carried out with a T-number and a shutter speed of a first photographing state without execution of said electronic flash unit, is not more than 8.5; and a difference between a background luminance and a luminance of a reference reflection panel is within a latitude of said image carrier that said image is able to be formed thereon when said reference reflection panel being placed at a predetermined distance between 2–3 m from said lens-fitted film unit is illuminated by said electronic flash unit under said minimum photographing luminance as said background luminance in said first photographing state.

28. The image forming method of claim 27, wherein said minimum photographing luminance is an EV value of a reference exposure amount of said lens-fitted film unit under said first photographing state minus 1.5.

29. A lens-fitted film unit, comprising:

a main body;

a photographic film, pre-loaded in said main body;

an electronic flash unit;

a shutter unit;

a camera lens; and a diaphragm;

wherein a guide number of said electronic flash unit, a T-number determined from said camera lens and said diaphragm and a shutter speed of said shutter unit are determined so that a minimum photographing luminance, which enables latent image forming on said photographic film by which an image is able to be formed on an image carrier when a photographing operation is carried out in a first photographing state without execution of said electronic flash unit, is not more than 8.5; and a difference between a background luminance and a luminance of a reference reflection panel is within a latitude of said image carrier that said image is able to be formed thereon when said reference reflection panel being placed at a predetermined distance between 2–3 m from said lens-fitted film unit is illuminated by said electronic flash unit under said minimum photographing luminance as said background luminance in said first photographing state.

30. The lens-fitted film unit of claim 29, wherein said minimum photographing luminance is an EV value of a reference exposure amount of said lens-fitted film unit under said first photographing state minus 1.5.

* * * * *